United States Patent
van Vuuren et al.

(10) Patent No.: US 11,145,100 B2
(45) Date of Patent: Oct. 12, 2021

(54) METHOD AND SYSTEM FOR IMPLEMENTING THREE-DIMENSIONAL FACIAL MODELING AND VISUAL SPEECH SYNTHESIS

(71) Applicant: The Regents of the University of Colorado, a Body Corporate, Denver, CO (US)

(72) Inventors: Sarel van Vuuren, Longmont, CO (US); Nattawut Ngampatipatpong, Longmont, CO (US); Robert N. Bowen, Broomfield, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/477,591

(22) PCT Filed: Jan. 12, 2018

(86) PCT No.: PCT/US2018/013593
§ 371 (c)(1),
(2) Date: Jul. 12, 2019

(87) PCT Pub. No.: WO2018/132721
PCT Pub. Date: Jul. 19, 2018

(65) Prior Publication Data
US 2020/0126283 A1   Apr. 23, 2020

Related U.S. Application Data

(60) Provisional application No. 62/445,614, filed on Jan. 12, 2017.

(51) Int. Cl.
*G06T 13/40* (2011.01)
*G06K 9/00* (2006.01)
(Continued)

(52) U.S. Cl.
CPC .......... *G06T 13/40* (2013.01); *G06K 9/00281* (2013.01); *G06T 13/205* (2013.01);
(Continued)

(58) Field of Classification Search
None
See application file for complete search history.

(56) References Cited

U.S. PATENT DOCUMENTS

| 5,943,648 A | * | 8/1999 | Tel | G10L 13/08 |
| | | | | 704/258 |
| 6,250,928 B1 | * | 6/2001 | Poggio | G09B 19/04 |
| | | | | 345/473 |

(Continued)

FOREIGN PATENT DOCUMENTS

WO   WO-2018-132721 A1   7/2018

OTHER PUBLICATIONS

International Preliminary Report on Patentability, International Application No. PCT/US2018/013593, dated Jul. 25, 2019, 9 pages.
(Continued)

*Primary Examiner* — Ryan M Gray
(74) *Attorney, Agent, or Firm* — Adsero IP

(57) ABSTRACT

Novel tools and techniques are provided for implementing three-dimensional facial modeling and visual speech synthesis. In various embodiments, a computing system might determine an orientation, size, and location of a face in a received input image; retrieve a three-dimensional model template comprising a face and head; project the input image onto the model template to generate a three-dimensional model; define, on the model, a polygon mesh in a region of facial feature corresponding to feature in the input image; adjust parameters on the model; and display the model. The computing system might parse a text string into allophonic units; encode each allophonic unit into a point(s) in linguis-
(Continued)

tic space corresponding to mouth movements; retrieve, from a codebook, indexed images/morphs corresponding to encoded points in the linguistic space; render the indexed images/morphs into an animation of the three-dimensional model; synchronize, for output, the animation with audio representations of the text string.

25 Claims, 27 Drawing Sheets

(51) Int. Cl.

| | | |
|---|---|---|
| *G06T 13/20* | (2011.01) | |
| *G06T 15/04* | (2011.01) | |
| *G06T 15/20* | (2011.01) | |
| *G06T 17/10* | (2006.01) | |
| *G06T 17/20* | (2006.01) | |
| *G10L 21/10* | (2013.01) | |

(52) U.S. Cl.
CPC ............ *G06T 15/04* (2013.01); *G06T 15/205* (2013.01); *G06T 17/10* (2013.01); *G06T 17/20* (2013.01); *G10L 21/10* (2013.01); *G06T 2210/12* (2013.01)

(56) References Cited

U.S. PATENT DOCUMENTS

| | | | | |
|---|---|---|---|---|
| 6,449,595 | B1* | 9/2002 | Arslan | G06T 13/205 |
| | | | | 348/515 |
| 2006/0009978 | A1* | 1/2006 | Ma | 704/266 |
| 2009/0135177 | A1* | 5/2009 | Strietzel | G06Q 30/02 |
| | | | | 345/419 |
| 2009/0153552 | A1 | 6/2009 | Fidaleo et al. | |
| 2010/0085363 | A1* | 4/2010 | Smith | H04N 5/262 |
| | | | | 345/473 |
| 2012/0280974 | A1* | 11/2012 | Wang | G10L 21/10 |
| | | | | 345/419 |
| 2012/0323581 | A1* | 12/2012 | Strietzel | G06T 13/40 |
| | | | | 704/276 |
| 2014/0085293 | A1* | 3/2014 | Konoplev | A63F 13/10 |
| | | | | 345/419 |
| 2014/0362091 | A1* | 12/2014 | Bouaziz | G06T 15/503 |
| | | | | 345/473 |
| 2015/0213604 | A1* | 7/2015 | Li | G06K 9/00315 |
| | | | | 345/473 |
| 2016/0300379 | A1* | 10/2016 | Du | G06K 9/00248 |
| 2018/0033190 | A1* | 2/2018 | Ma | G06T 13/40 |

OTHER PUBLICATIONS

International Search Report & Written Opinion, International Application No. PCT/US2018/013593, dated Apr. 4, 2018, 14 pages.

\* cited by examiner

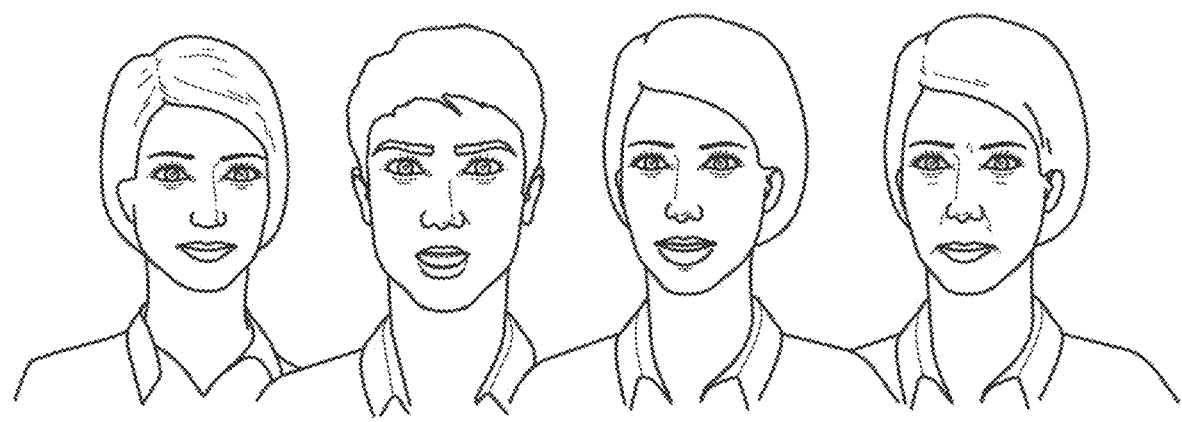
Fig. 2F
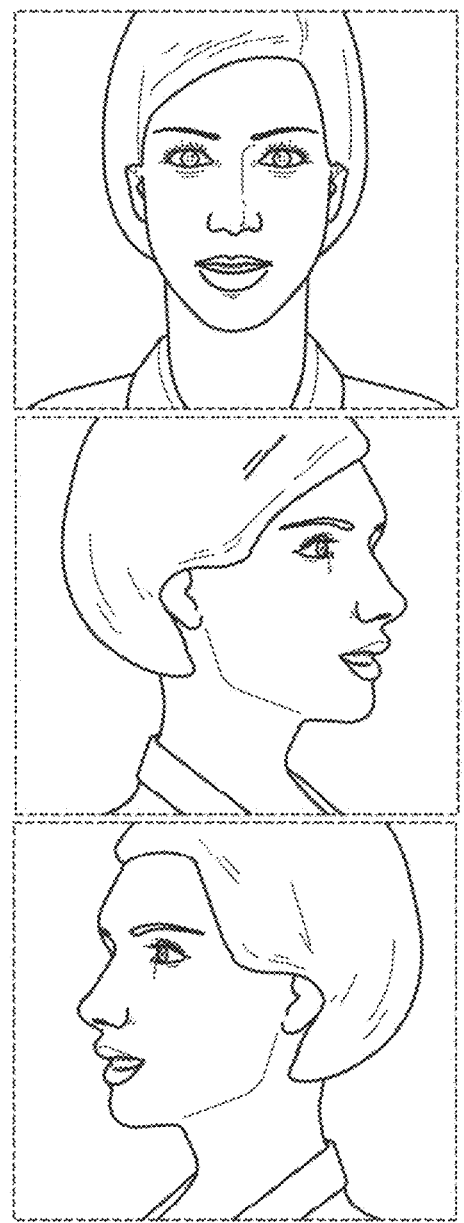
Fig. 2G
Fig. 2H
Fig. 2I

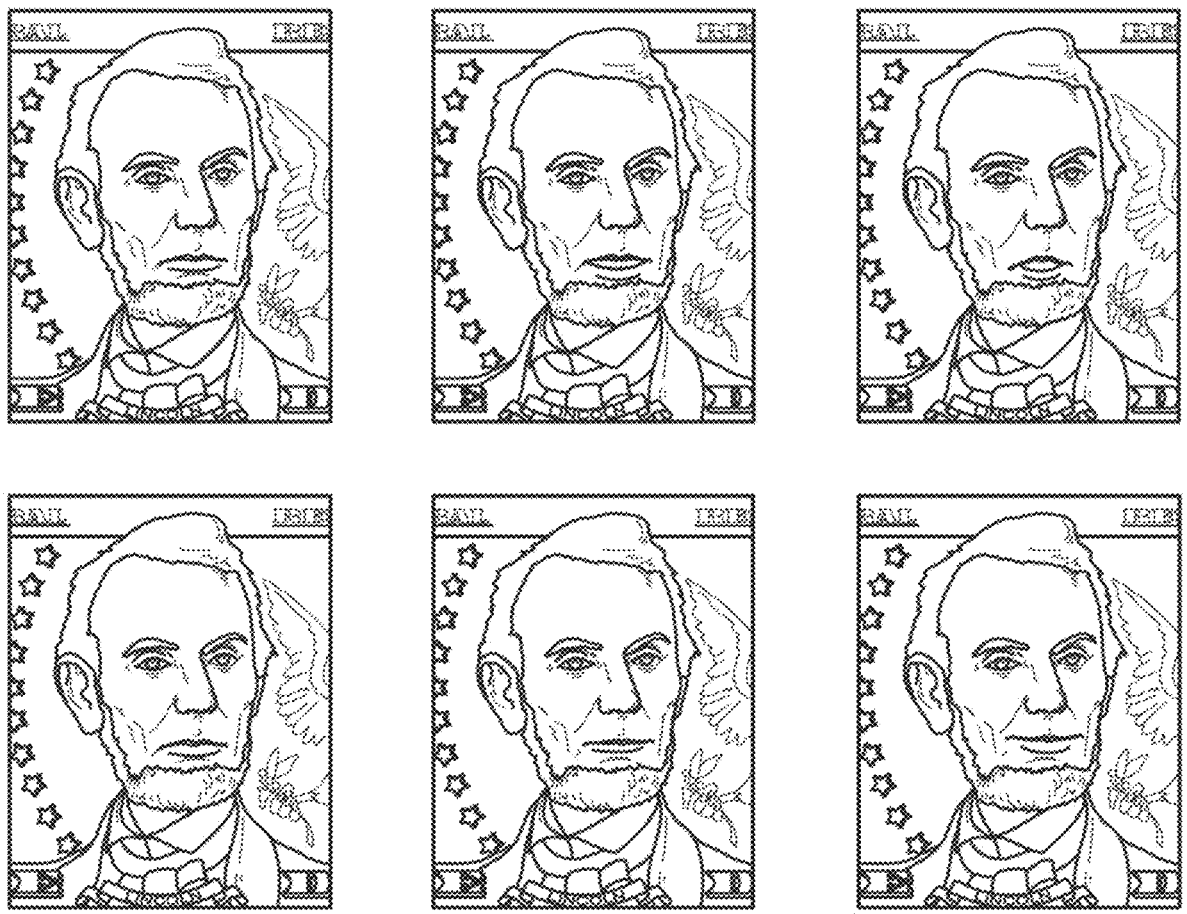
Fig. 3G
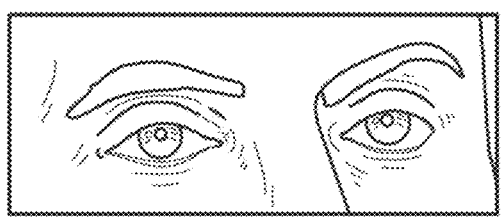
Fig. 3H
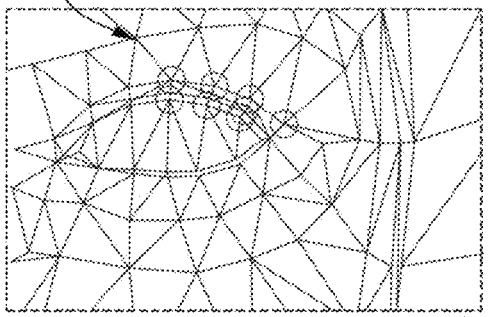
Fig. 3I
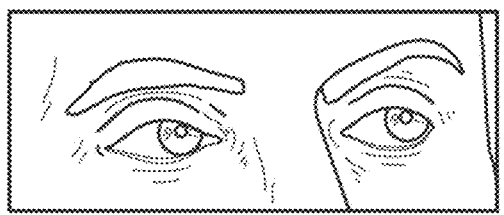

Fig. 4B

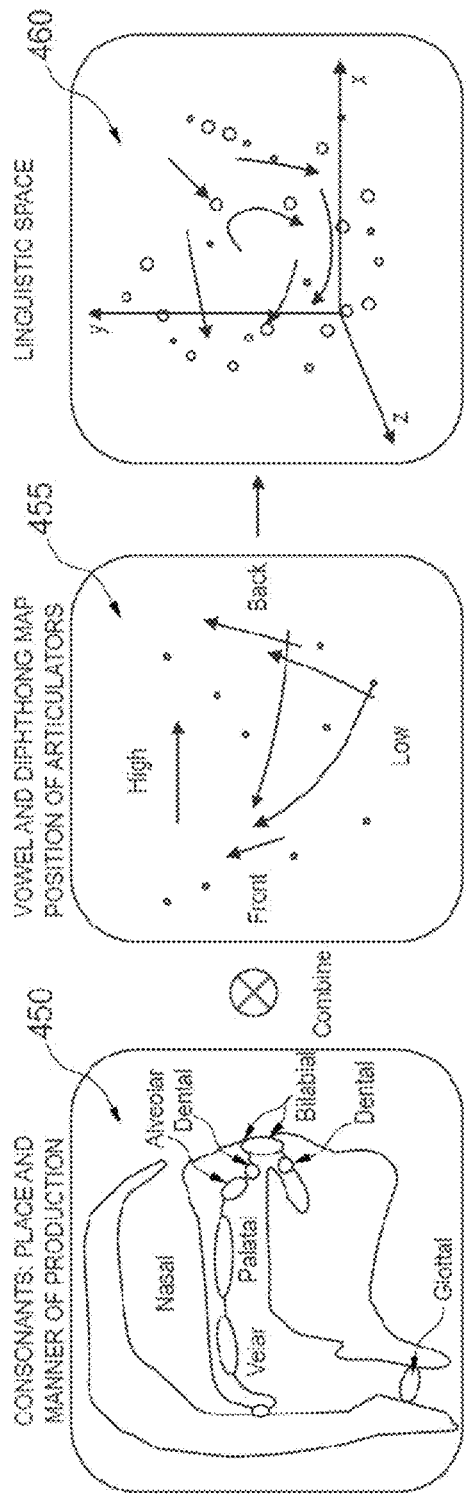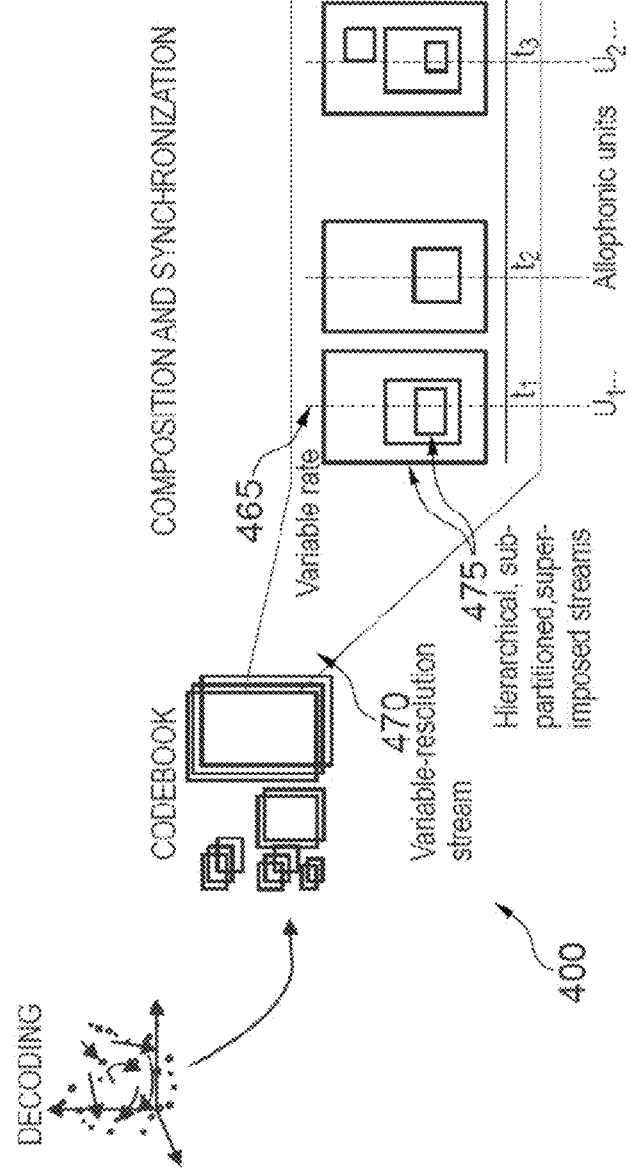

Examples of English Consonants using ARPABET notation

| B | P | T | D | G | K | BD | PD | TD | DD | GD | KD |
|---|---|---|---|---|---|----|----|----|----|----|----|
| buck | puck | tub | dust | gut | come | cub | cup | lot | had | mug | talk |
| CH | JH | HH | DX | TS | Y | W | L | R | M | N | NG |
| chuck | jug | hub | butter | bits | yuck | whole | luck | rub | much | nut | sung |
| F | V | TH | DH | S | Z | SH | ZH | | | | |
| fun | divulge | thud | the | sub | result | shut | decision | | | | |

Consonants in English grouped by place and manner of articulation

| | | Place of articulation | | | | | |
|---|---|---|---|---|---|---|---|
| | | Labial | Labial/Dental | Dental | Alveolar | Palatal | Velar |
| Manner of articulation | Stop | P B | | | T D | | G K |
| | Affricate | | | | | CH JH | |
| | Fricative | | F V | TH DH | S Z | SH ZH | |
| | Approximant | | | | | Y | W |
| | Nasal | M | | | N | | NG |
| | Liquid | | | | L | | R |

English consonants: place of articulation

| Labial | Restriction formed by lips touching | /M/ much, /B/ buck, /P/ puck |
|---|---|---|
| Labial/dental | Restriction formed by lower lip touching upper teeth. | /F/ fun, /V/ divulge |
| Dental | Restriction formed by tongue behind upper teeth with tip touching between teeth. | /TH/ thud, /DH/ the |
| Alveolar | Restriction from tongue tip pressing against alveolar ridge and back of upper teeth. Restriction from tongue pressing against alveolar ridge. | /T/ tub, /D/ dust /S/ sub, /Z/ result |
| Palatal | Restriction from blade of tongue pressing against palate. Restriction from front of tongue pressing almost against palate. | /SH/ shut, /ZH/ decision, /CH/ chuck, /JH/ jug /Y/ yet |
| Velar | Restriction from back of tongue pressing against velum. | /G/ gut, /K/ come, /NG/ sung |
| Glottal | Restriction by closing glottis. | |

English consonants: manner of articulation

| | | |
|---|---|---|
| Stop | Airflow is completely blocked and released. | /B/ buck, /D/ dust, /G/ gut, /P/ puck, /T/ tub, /K/ come |
| | Airflow is completely blocked and not released. | /B/ cub, /D/ had, /G/ mug, /P/ cup, /T/ lot, /K/ talk |
| Nasal | The velum lowers, routing air through the nasal tract. | /N/ nut, /M/ much, /NG/ sung |
| Fricative | Labio-dental - air is forced through upper teeth. | /F/ fun, /V/ divulge |
| | Dental - air is forced around tongue. | /TH/ thud, /DH/ the |
| | Alveolar - air is forced past edge of teeth. | /S/ sub, /Z/ result |
| | Palatal - air is forced through a grove in the tongue. | /SH/ shut, /ZH/ decision |
| Approximant | Airflow partially obstructed by front of tongue close to palate. | /Y/ yet |
| | Airflow partially obstructed by back of tongue close to velum. | /W/ went |
| | Obstruction by tip of tongue extended or bunched up close to palate. | /R/ rub |
| | Tip of tongue against alveolar ridge with sides of tongue lowered. | /L/ luck |

English vowels, diphthongs and semi-vowels

| Vowel | Example | Diphthong | Example | Semi-vowel | Example |
|---|---|---|---|---|---|
| IY | he | | | Y | yet |
| IH | bitter | EY | stale | | |
| EH | bed | | | | |
| AE | mad | AY | hire | | |
| IX | roses | | | | |
| AX | about | | | | |
| AH | but | | | | |
| ER | bird | | | | |
| AXR | butter | | | | |
| AA | father | OY | boy | | |
| AO | for | AW | frown | | |
| UH | hood | OW | cone | | |
| UW | moon | | | W | whole |

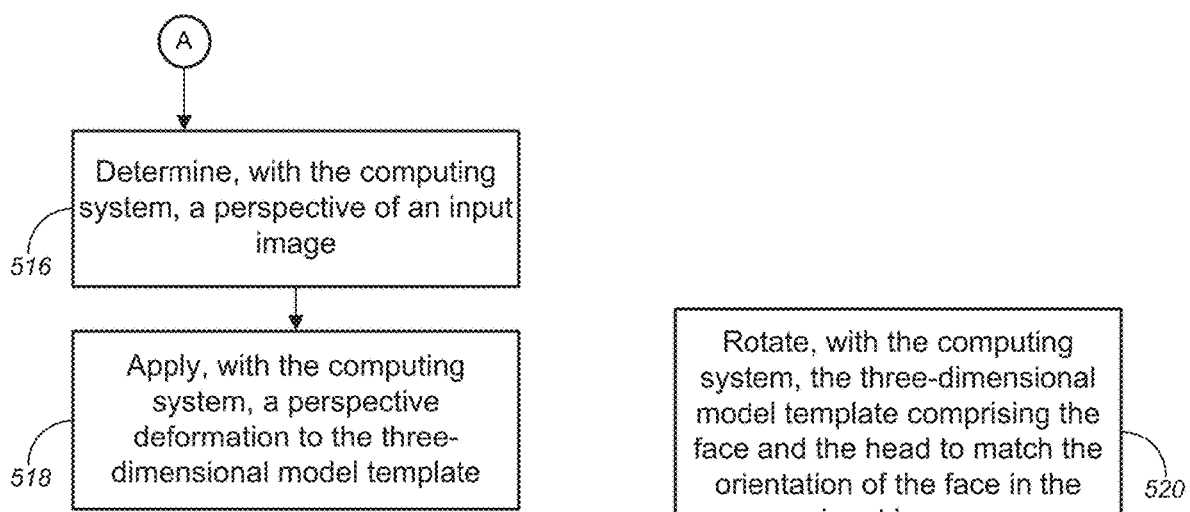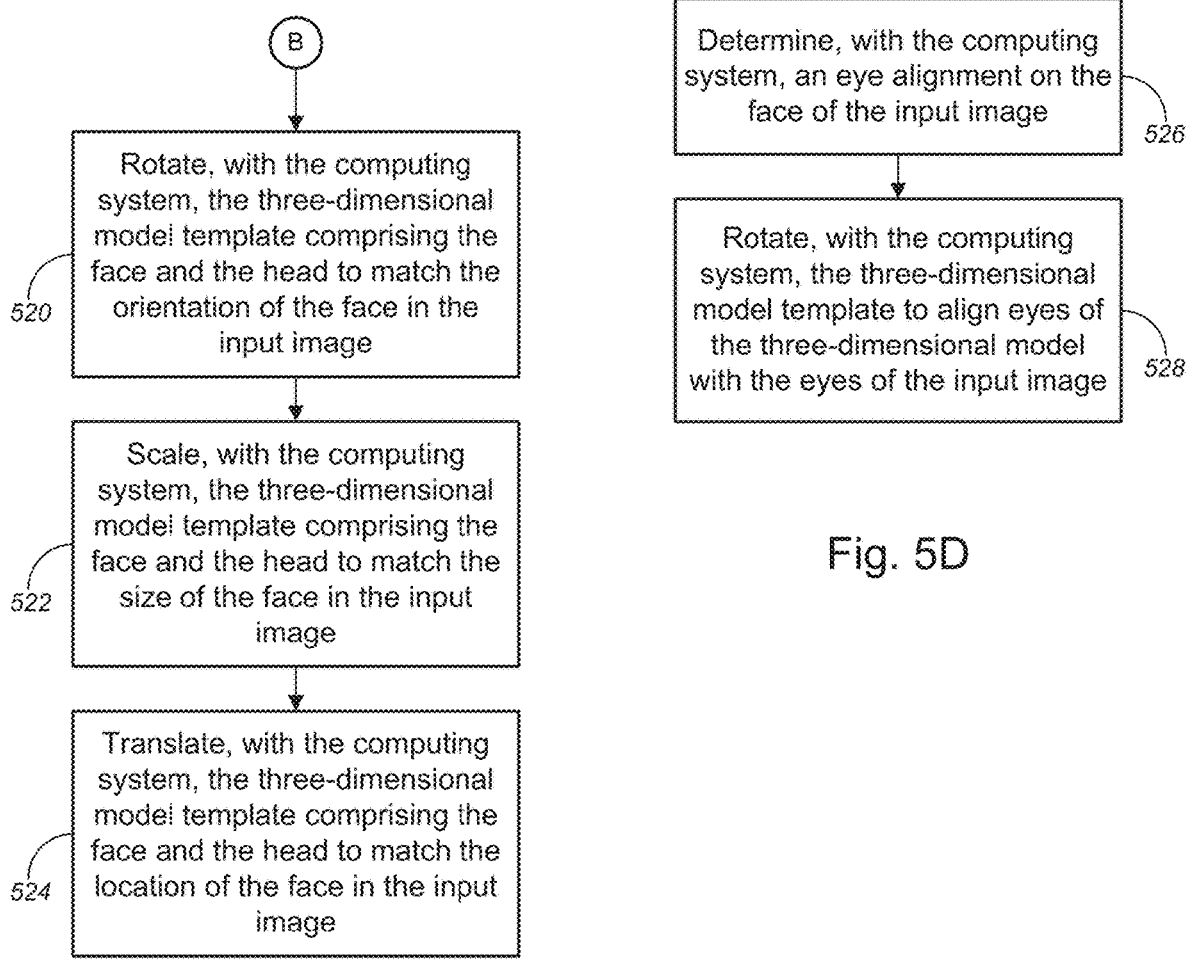

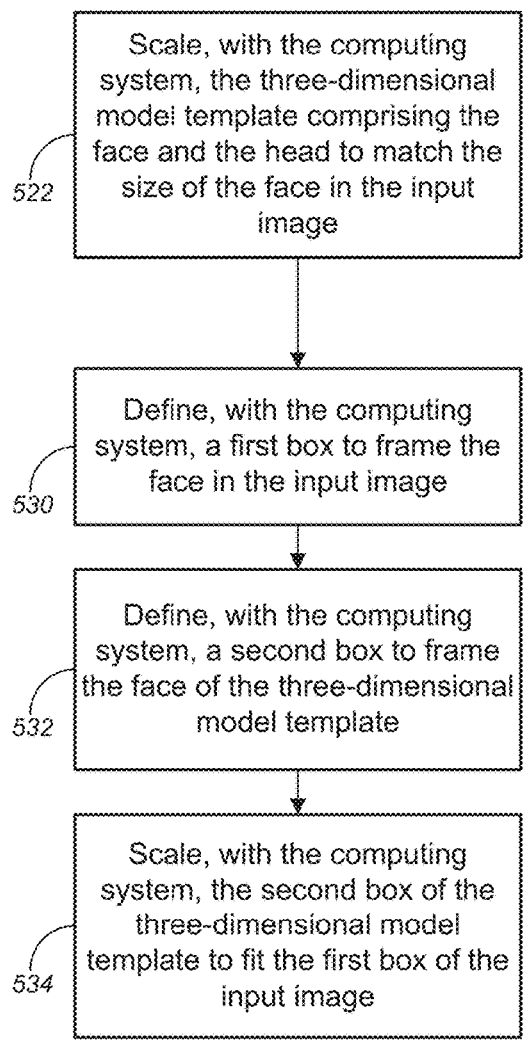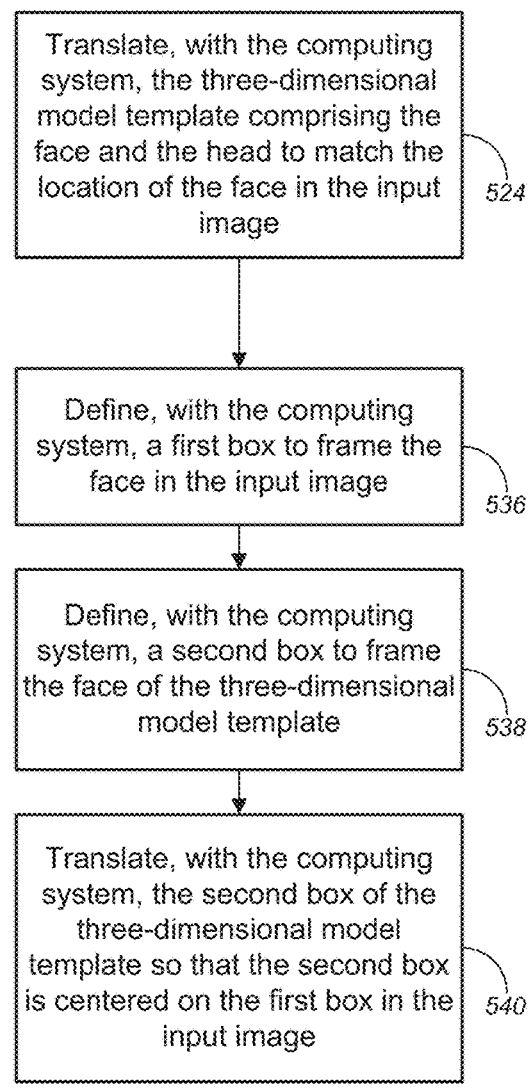
Fig. 5E
Fig. 5F

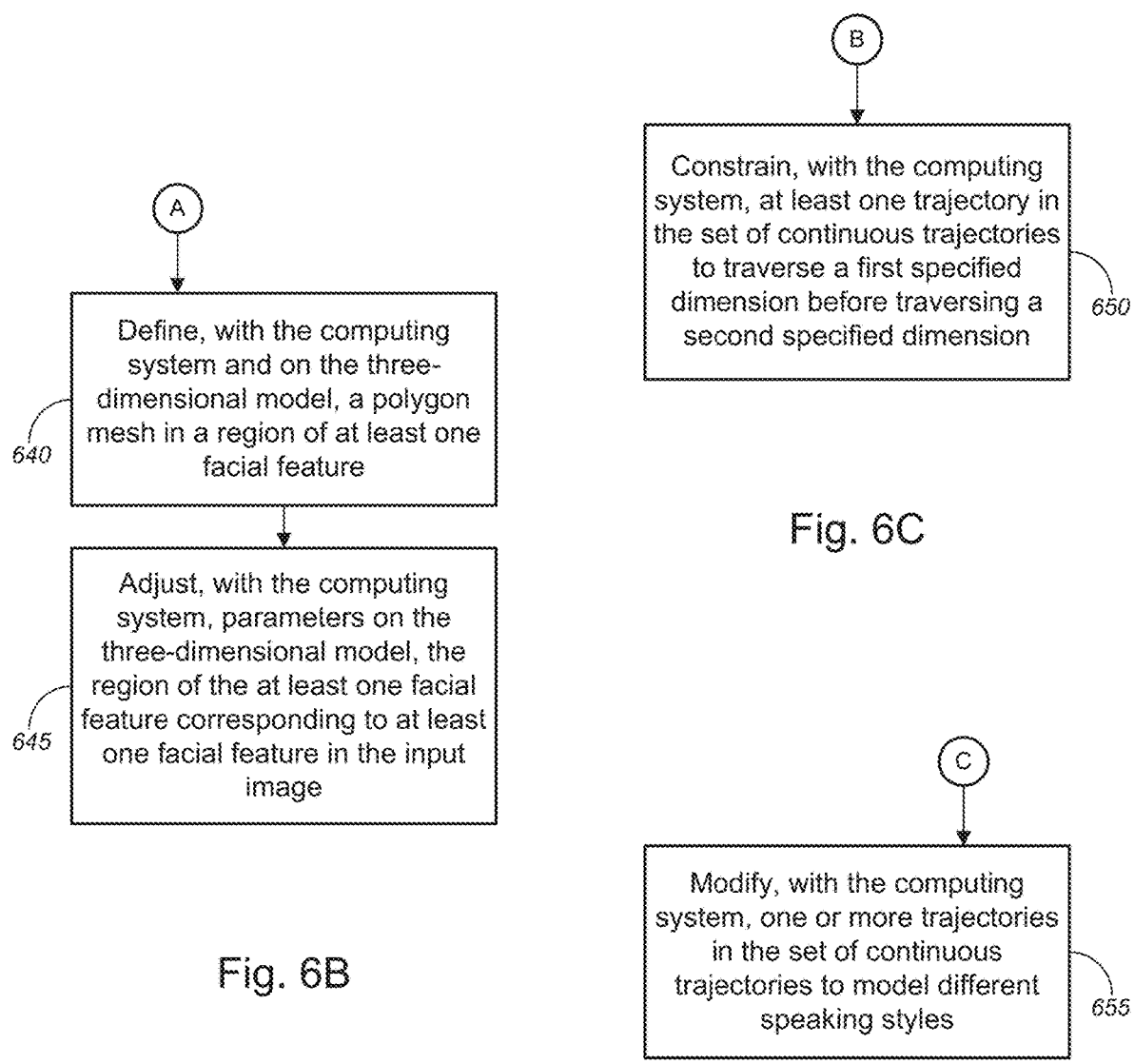

METHOD AND SYSTEM FOR IMPLEMENTING THREE-DIMENSIONAL FACIAL MODELING AND VISUAL SPEECH SYNTHESIS

CROSS-REFERENCES TO RELATED APPLICATIONS

This application a '371 application of International Application No. PCT/US18/13593 filed Jan. 12, 2018 by Sarel van Vuuren et al., entitled, "Method and System for Implementing Three-Dimensional Facial Modeling and Visual Speech Synthesis," which claims priority to U.S. Patent Application Ser. No. 62/445,614 (the "'614 application"), filed Jan. 12, 2017 by Sarel van Vuuren et al., entitled, "Three Dimensional Facial Modeling and Visual Speech Synthesis," the disclosures of which are incorporated herein by reference in their entirety for all purposes.

GOVERNMENT GRANT

This invention was made in part with government support under grant number 1R01DC011754 awarded by the National Institute on Deafness and Other Communication Disorders (NIDCD), National Institutes of Health, U.S. Department of Health & Human Services, 90RE5019 awarded by the National Institute on Disability, Independent Living, and Rehabilitation Research, Administration for Community Living, U.S. Department of Health & Human Services, and H133E090003 awarded by the National Institute on Disability and Rehabilitation Research, U.S. Department of Education. The government has certain rights in the invention.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in some aspects, to methods, systems, apparatus, and computer software for turning a two-dimensional image into a three-dimensional model, and, in particular embodiments, to methods, systems, apparatus, and computer software for turning a two-dimensional image of a face(s) or likeness into a talking expressive three-dimensional model. The present disclosure may also relate to methods, systems, apparatus, and computer software for simulating visual speech.

BACKGROUND

The need to communicate and learn using speech, images, and text is central to almost everything we do, and is a major driver for the mobile and Internet technologies we use to make phone and video calls, surf the web, chat, and message. As of 2016, in the U.S., www.pewinterest.org estimates that 89% of adults use the Internet (including 58% of seniors), and 72% have a smart phone. Worldwide, this is 67% and 43%, respectively. And as of Q3 2016, more than 178 million people in the U.S. and Canada (and 1.1 billion people worldwide) use Facebook every day. Yet, an estimated 15% of the population, are faced with specific communication challenges that impact their speech, language, hearing, and/or reading ability, often with significant socio-economic cost. Poor communication abilities adversely affect participation in social, educational, and/or healthcare activities. It is estimated that low literacy adds USD 200 billion to annual U.S. healthcare costs, and that the costs of aphasia, which impairs speaking ability and affects 1+ million people in the U.S., is USD$31 billion.

To address personal communication and learning needs, the speech, language, and reading service sectors (including therapy and education) provide solutions that often require face-to-face interaction—whether for assistance, or long-term, intensive intervention. But socio-economic factors, availability, and access, limit the amount of professional help individuals can receive. While employment in the therapy sector is projected to grow 21% per decade, changing demographics are causing needs to grow even faster.

Automation may help, but current solutions and interfaces largely lack the personalized face part of face-to-face interaction, consisting instead of interactive voice response and customer relationship management ("CRM") services for mainstream consumers, or otherwise relatively static education and therapy oriented apps, that link words, letters, sentences, pictures, and/or video clips of speakers to corresponding audio.

Hence, there is a need for more robust and scalable solutions for implementing three-dimensional facial modeling and visual speech synthesis.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2I are schematic diagrams illustrating various embodiments for mapping a two-dimensional image onto a three-dimensional model for implementing three-dimensional facial modeling and visual speech synthesis.

FIGS. 4A-4L are schematic diagrams illustrating various embodiments for implementing visual speech synthesis.

FIGS. 5A-5G are flow diagrams illustrating a method for implementing three-dimensional facial modeling and visual speech synthesis, in accordance with various embodiments.

FIGS. 6A-6E are flow diagrams illustrating another method for implementing three-dimensional facial modeling and visual speech synthesis, in accordance with various embodiments.

DETAILED DESCRIPTION OF CERTAIN EMBODIMENTS

Overview

Figure 1:
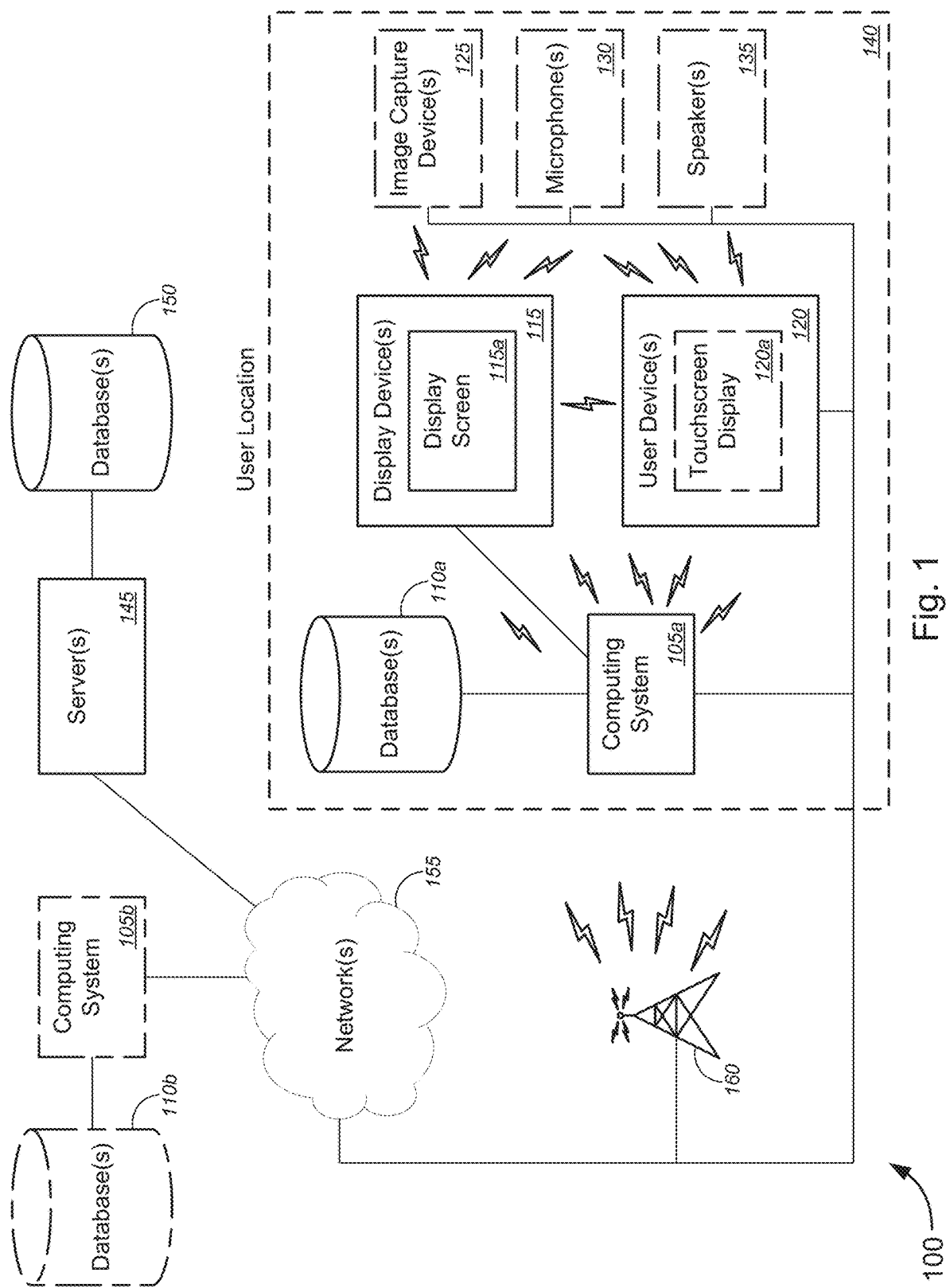
FIG. 1 is a schematic diagram illustrating a system for implementing three-dimensional facial modeling and visual speech synthesis, in accordance with various embodiments.

Various embodiments provide tools and techniques for implementing three-dimensional facial modeling and visual speech synthesis.

In various embodiments, a computing system might receive an input image comprising a face; determine an orientation, a size, and a location of the face in the input image; retrieve a three-dimensional model template comprising a face and a head; project the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and display the three-dimensional model with the face of the input image projected onto the three-dimensional model. In some cases, the computing system might further rotate the three-dimensional model template comprising the face and the head to match the orientation of the face in the input image; scale the three-dimensional model template comprising the face and the head to match the size of the face in the input image; translate the three-dimensional model template comprising the face and the head to match the location of the face in the input image; and/or the like.

Alternatively, or additionally, the computing system might parse a string of text into one or more allophonic units of a plurality of allophonic units; encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieve, from a codebook that is stored in a data store, a plurality of indexed images or morphs, each of the indexed images or morphs corresponding to a respective encoded point in the linguistic space, the codebook comprising an index of images or morphs; render the plurality of indexed images or morphs into an animation of the three-dimensional model; synchronize the animation of the three-dimensional model with an audio representation of the string of text; and output the synchronized animation and the audio representation.

According to some aspects, the new approach proposed herein and consistent with the above-mentioned overview uses dynamic content and 3D photo-realistic talking agents to deliver personalized help and practice. Designed from the ground up, the technology has several advantages over existing approaches. It offers: 3D agents with accurate audio-visual speech and affective caring expressions; the ability to automatically create a personalized 3D agent from a 2D photo/selfie; seamless low-bandwidth real-time or near real-time web and mobile operation; and asynchronous integration with social media such as Facebook, for messaging and shared content. None of these capabilities exist in the speech, language, learning, and literacy (reading) services sector, and the inventors are not currently aware of a similar combination in any market. Current web and mobile agents are mostly 2 or 2.5 dimensional; or designed for 3D games, research, CRM, entertainment, or video delivery—most lacking accurate 3D speech or are otherwise unsuitable for the applications considered here (namely, real-time or near real-time visual speech interactions, or the like).

The techniques and systems described herein are used to develop therapy and educationally oriented wellness and self-help products for the speech, language, and reading services market. The speech, language, and reading services market is technologically underserved, and has potential for cross-over to other markets. Working web and mobile (Android) prototypes using the technology end-to-end have been built, separate PC research systems for individuals with aphasia and reading difficulties have been developed, and performance and accuracy of the underlying technology have been validated.

The various embodiments offer a new technology solution for the speech, language, and literacy (reading) services market—3D photo-realistic talking agents to interactively deliver help and practice. The opportunity is to provide high fidelity web and mobile experiences that mimic face-to-face interaction and intervention, but are automatic, and to support personalized sound, letter, word, sentence, and dialogue level practice, to feature dynamic social sharable content, and to facilitate sentence level communication and messaging. For individuals (and their caregivers), the technology provides new opportunities to get interactive, personalized face-to-face help, anytime, anywhere. For the professionals serving them, the technology provides a differentiating solution, allowing a cost-effective way to deliver more help and services, anytime, anywhere, interactively, to more customers.

The technology enables asynchronous and/or (near) real-time, face-to-face communication with a high-fidelity 3D agent. As a platform, it has the potential to personalize user experiences in consumer facing markets, including consumer relations management, marketing, education, language learning, healthcare, information services, and entertainment, or the like.

Within the speech-language-therapy-reading market, customers for products and services based on the various embodiments might be professionals—speech language pathologists ("SLPs") and teachers or tutors—providing speech, language, and reading intervention, and the people that they serve. This includes adult and pediatric SLPs, teachers, and tutors. Together, they serve an estimated 15% of the population who are impacted selectively by: aphasia; Parkinson's; Alzheimer's; Autism; hearing loss; young readers (new and remedial); and adult readers; etc. Customers might also include caregiver families who can significantly benefit from products or services based on the various embodiments.

Various embodiments provide a number of different tools, including, without limitation, systems and methods that can provide and enable visual speech modeling, including how to implement such modeling across web and mobile devices, affective expression modeling, and mapping of 2D photo based faces to 3D models.

Although the various embodiments described herein are directed to speech-language therapy or the like, the techniques described herein (and the implementing hardware and software) may be used to enhance any two-dimensional or three-dimensional visual speech or affective facial expression representation. For instance, the various embodiments, may be applicable to animating two-dimensional or three-dimensional icons or avatars having faces (and/or heads) that may be used in social media applications, messaging applications, profile applications, street or bulletin signage, advertisements, video games, television programs, movies, or any other category of video representations, or the like.

In some embodiments, a 2D image of a selfie, photo, or graphic of a face(s) or similar likeness may be turned into a talking expressive 3D model(s). Functionalities enabled by such techniques might include, without limitation, taking a selfie or uploading a photo (or image) of a face then typing or saying text and watching the generated agent or avatar speak the typed or spoken text; using a user interface ("UI") to mark up the text with, e.g., <smile>, <sad>, <angry>, <blink>, <look_left>, <turn_right>, and/or the like, to create emotions and expressions in the generated agent or avatar; manually tagging eye and mouth points on a face or using automatic tagging if supported on the user's computer, mobile, tablet, TV, device, or browser, etc.; typing or speaking text and watching the generated agent or avatar say it; watching and hearing the generated agent say and express text or voice feedback automatically; and/or the like. The basic idea of the techniques described herein is that a 2D image that contains the likeness of a face(s) can be turned into a talking expressive 3D model(s) (of a generated agent(s) or avatar(s), or the like), with accurate visible or visual speech, expressive emotions, and eye and head gestures, and/or the like.

These and other functions of the methods and systems are described in greater detail below with respect to FIGS. 1-10.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, 2D to 3D modeling technology, affective facial expression technology, visual speech technology, user interaction technology, and/or the like. In other aspects, certain embodiments can improve the functioning of user equipment or systems themselves (e.g., user interface devices, communications systems, speech-language therapeutic interaction devices, etc.), for example, by receiving, with a computing system, an input image comprising a face; determining, with the computing system, an orientation, a size, and a location of the face in the input image; retrieving, with the computing system, a three-dimensional model template comprising a face and a head; projecting, with the computing system, the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and displaying, with the computing system, the three-dimensional model with the face of the input image projected onto the three-dimensional model; and/or the like. Alternatively, or additionally, the various embodiments can improve the functioning of user equipment or systems themselves, for example, by render images or morphs into animations of the three-dimensional models to cause the projected input image to simulate visual speech, by parsing, with the computing system, a string of text into one or more allophonic units of a plurality of allophonic units; encoding, with the computing system, each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieving, with the computing system and from a codebook that is stored in a data store, a plurality of indexed images or morphs, each of the indexed images or morphs corresponding to a respective encoded point in the linguistic space, the codebook comprising an index of images or morphs; rendering, with the computing system, the plurality of indexed images or morphs into an animation of the three-dimensional model; synchronizing, with the computing system, the animation of the three-dimensional model with an audio representation of the string of text; and outputting with the computing system, the synchronized animation and the audio representation; and/or the like.

In particular, to the extent any abstract concepts are present in the various embodiments, those concepts can be implemented as described herein by devices, software, systems, and methods that involve specific novel functionality (e.g., steps or operations), such as, providing or generating 3D agents with accurate audio-visual speech and affective facial (in some cases, caring) expressions; providing the ability to automatically create a personalized 3D agent from a 2D photo/selfie; providing seamless low-bandwidth anywhere, anytime, real-time or near-real-time web and mobile operation; and providing asynchronous integration with social media such as Facebook, for messaging and shared content; and/or the like, to name a few examples, that extend beyond mere conventional computer processing operations. These functionalities can produce tangible results outside of the implementing computer system, including, merely by way of example, optimized presentation and interaction with users using 3D agents having accurate audio-visual speech and affective facial expressions, such optimized presentation and interaction utilizing seamless low-bandwidth anywhere, anytime, real-time or near real-time web and mobile operations, and/or the like, at least some of which may be observed or measured by customers and/or service providers.

In an aspect, a method might comprise receiving, with a computing system, an input image comprising a face; determining, with the computing system, an orientation, a size, and a location of the face in the input image; and retrieving, with the computing system, a three-dimensional model template comprising a face and a head. The method might further comprise projecting, with the computing system, the input image onto the three-dimensional model template comprising the face and the head to generate a three-dimensional model corresponding to the input image; defining, with the computing system and on the three-dimensional model, a polygon mesh in a region of at least one facial feature; adjusting, with the computing system, parameters on the three-dimensional model, the region of the at least one facial feature corresponding to at least one facial feature in the input image; and displaying, with the computing system, the three-dimensional model with the face of the input image projected onto the three-dimensional model.

In some embodiments, the computing system might comprise at least one of a client computer, a host computer, a user device, a server computer over a network, a cloud-based computing system, or a distributed computing system, and/or the like. In some cases, the input image is captured with an image sensor of a device. Alternatively, or additionally, the input image is at least one of a photograph or a drawing, or the like.

According to some embodiments, rotating the three-dimensional model might comprise determining, with the computing system, an eye alignment on the face of the input image; and rotating, with the computing system, the three-dimensional model template to align eyes of the three-dimensional model with the eyes of the input image. In some instances, scaling the three-dimensional model might comprise defining, with the computing system, a first box to frame the face in the input image; defining, with the computing system, a second box to frame the face of the three-dimensional model template; and scaling, with the computing system, the second box of the three-dimensional model template to fit the first box of the input image. In some cases, translating the three-dimensional model might comprise defining, with the computing system, a first box to frame the face in the input image; defining, with the computing system, a second box to frame the face of the three-dimensional model template; and translating, with the computing system, the second box of the three-dimensional model template so that the second box is centered on the first box in the input image.

Merely by way of example, in some cases, the three-dimensional model template might comprise at least one facial feature, and the method might further comprise determining, with the computing system, at least one facial feature on the face of the input image; determining, with the computing system, an orientation, a size, and a location of the at least one facial feature on the face in the input image; rotating, with the computing system, the three-dimensional model template to orient the at least one facial feature to the corresponding at least one facial feature in the input image; scaling, with the computing system, the three-dimensional model template to match the size of the at least one facial feature to the corresponding at least one facial feature in the input image; translating, with the computing system, the three-dimensional model template to match the location of the at least one facial feature to the corresponding at least one facial feature in the input image; and projecting, with the computing system, the at least one facial feature in the input image onto the corresponding at least one facial feature of the three-dimensional model template to represent the at least one facial feature on the three-dimensional model. In some instances, the at least one facial feature of the input image might comprise at least one of an eye, lip, eyebrow, nose, cheek, ear, forehead, chin, or neck, and/or the like, while the at least one facial feature of the three-dimensional model might comprise at least one of an eye, lip, eyebrow, nose, cheek, ear, forehead, chin, or neck, and/or the like.

According to some embodiments, the method might further comprise determining, with the computing system, a perspective of an input image; and applying, with the computing system, a perspective deformation to the three-dimensional model template. In some cases, the display of the three-dimensional model is capable of being rotated in any direction, or the like. In some embodiments, the method might further comprise rotating, with the computing system, the three-dimensional model template comprising the face and the head to match the orientation of the face in the input image; scaling, with the computing system, the three-dimensional model template comprising the face and the head to match the size of the face in the input image; and translating, with the computing system, the three-dimensional model template comprising the face and the head to match the location of the face in the input image.

In another aspect, a device might comprise a display; one or more processors in communication with an image sensor, an accelerometer, and the display; and a non-transitory computer readable medium in communication with the one or more processors. The non-transitory computer readable medium might have encoded thereon a set of instructions executable by the one or more processors to cause the device to: receive an input image comprising a face; determine an orientation, a size, and a location of the face in the input image; retrieve a three-dimensional model template comprising a face and a head; project the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and display the three-dimensional model with the face of the input image projected onto the three-dimensional model.

In yet another aspect, an apparatus might comprise one or more processors and a non-transitory computer readable medium having encoded thereon a set of instructions executable by the one or more processors to cause the apparatus to: receive an input image comprising a face; determine an orientation, a size, and a location of the face in the input image; retrieve a three-dimensional model template comprising a face and a head; project the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and display the three-dimensional model with the face of the input image projected onto the three-dimensional model.

In another aspect, a method might comprise parsing, with a computing system, a string of text into one or more allophonic units of a plurality of allophonic units; encoding, with the computing system, each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; and retrieving, with the computing system and from a codebook that is stored in a data store, a plurality of indexed images or morphs, each of the indexed images or morphs corresponding to a respective encoded point in the linguistic space, the codebook comprising an index of images or morphs. The method might further comprise rendering, with the computing system, the plurality of indexed images or morphs into an animation of the three-dimensional model; synchronizing, with the computing system, the animation of the three-dimensional model with an audio representation of the string of text; and outputting, with the computing system, the synchronized animation and the audio representation.

According to some embodiments, the method might further comprise defining, with the computing system and on the three-dimensional model, a polygon mesh in a region of at least one facial feature; and adjusting, with the computing system, parameters on the three-dimensional model, the region of the at least one facial feature corresponding to the at least one facial feature in the input image, wherein rendering the plurality of indexed images or morphs into an animation of the three-dimensional model comprises utilizing a series of the adjusted parameters on the three-dimensional model corresponding to the plurality of indexed images or morphs. In some cases, adjusting parameters on the three-dimensional model might comprise simulating one or more emotions. Alternatively, or additionally, the codebook might comprise images or morphs corresponding to different emotions, and adjusting parameters might comprise retrieving images or morphs corresponding to selected emotions. Alternatively, or additionally, the region of the at least one facial feature might comprise a region of an eye, and adjusting parameters might comprise simulating a movement or blink of the eye.

In some embodiments, the method might further comprise constraining, with the computing system, at least one trajectory in the set of continuous trajectories to traverse a first specified dimension before traversing a second specified dimension. In some cases, the method might further comprise modifying, with the computing system, one or more trajectories in the set of continuous trajectories to model different speaking styles.

Merely by way of example, in some instances, the codebook might comprise a plurality of indexes of images or morphs, and a first index might include images or morphs based on the three-dimensional model at a first resolution. In some embodiments, a second index might include images or morphs based on the three-dimensional model at a second resolution. Alternatively, or additionally, the second index might include images or morphs based on a second three-dimensional model.

In yet another aspect, a device might comprise one or more processors and a non-transitory computer readable medium in communication with the one or more processors. The non-transitory computer readable medium might have encoded thereon a set of instructions executable by the one or more processors to cause the device to: parse a string of text into one or more allophonic units of a plurality of allophonic units; encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieve, from a codebook that is stored in a data store, a plurality of indexed images or morphs, each of the indexed images or morphs corresponding to a respective encoded point in the linguistic space, the codebook comprising an index of images or morphs; render the plurality of indexed images or morphs into an animation of the three-dimensional model; synchronize the animation of the three-dimensional model with an audio representation of the string of text; and output the synchronized animation and the audio representation.

In still another aspect, an apparatus might comprise one or more processors and a non-transitory computer readable medium in communication with the one or more processors. The non-transitory computer readable medium might have encoded thereon a set of instructions executable by the one or more processors to cause the apparatus to: parse a string of text into one or more allophonic units of a plurality of allophonic units; encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieve, from a codebook that is stored in a data store, a plurality of indexed images or morphs, each of the indexed images or morphs corresponding to a respective encoded point in the linguistic space, the codebook comprising an index of images or morphs; render the plurality of indexed images or morphs into an animation of the three-dimensional model; synchronize the animation of the three-dimensional model with an audio representation of the string of text; and output the synchronized animation and the audio representation.

In another aspect, a method might comprise receiving, with a computing system, an input image comprising a face; determining, with the computing system, an orientation, a size, and a location of the face in the input image; retrieving, with the computing system, a three-dimensional model template comprising a face and a head; projecting, with the computing system, the input image onto the three-dimensional model template comprising the face and the head to generate a three-dimensional model corresponding to the input image; defining, with the computing system and on the three-dimensional model, a polygon mesh in a region of at least one facial feature; adjusting, with the computing system, parameters on the three-dimensional model, the region of the at least one facial feature corresponding to at least one facial feature in the input image; and displaying, with the computing system, the three-dimensional model with the face of the input image projected onto the three-dimensional model. The method might further comprise parsing, with the computing system, a string of text into one or more allophonic units of a plurality of allophonic units; encoding, with the computing system, each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieving, with the computing system and from a codebook that is stored in a data store, a plurality of indexed images or morphs, each of the indexed images or morphs corresponding to a respective encoded point in the linguistic space, the codebook comprising an index of images or morphs; rendering, with the computing system, the plurality of indexed images or morphs into an animation of the three-dimensional model;

synchronizing, with the computing system, the animation of the three-dimensional model with an audio representation of the string of text; and outputting, with the computing system, the synchronized animation and the audio representation.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-10 illustrate some of the features of the method, system, and apparatus for implementing three-dimensional facial modeling and visual speech synthesis, as referred to above. The methods, systems, and apparatuses illustrated by FIGS. 1-10 refer to examples of different embodiments that include various components and steps, which can be considered alternatives or which can be used in conjunction with one another in the various embodiments. The description of the illustrated methods, systems, and apparatuses shown in FIGS. 1-10 is provided for purposes of illustration and should not be considered to limit the scope of the different embodiments.

With reference to the figures, FIG. 1 is a schematic diagram illustrating a system 100 for implementing three-dimensional facial modeling and visual speech synthesis, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise one or more display devices 115 (collectively, "display devices 115" or the like), which might each include a display screen 115a, and one or more user devices 120 (collectively, "user devices 120" or the like), which might each include a touchscreen display or touchscreen display device 120a (optional), and/or the like. In some cases, system 100 might further, or optionally, comprise one or more image capture devices 125 (collectively, "image capture devices 125" or the like), one or more microphones (or other audio capture devices, or the like) 130 (collectively, "microphones 130," "audio capture devices 130," or the like), one or more speakers (or other audio playback devices, or the like) 135 (collectively, "speakers 135," "audio playback devices 135," or the like), and/or the like. Each of the one or more display devices 115 and/or the one or more user devices 120 might communicatively couple to the computing system 105a, and/or to each other, either via wireless connection and/or via wired connection. The one or more user devices 120 might each receive user input from a user (in various embodiments, receiving touch input from the user via the (optional) touchscreen display 120a), and might each relay the user input to the computing system 105a, according to some embodiments. In some cases, the computing system 105a, the database 110a, the one or more display devices 115 (including the display screen(s) 115a, etc.), the one or more user devices 120, the (optional) one or more image capture devices 125, the (optional) one or more microphones 140, and/or the (optional) one or more speakers 145, or the like, may be disposed within a user location 140, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, a laboratory, a university or college facility, a research facility, a clinic, a speech-language pathologist's office or other treatment facility, a doctor's office or other medical facility, a video game publisher, a television or movie studio, a computer graphics studio, and/or the like.

System 100 might further comprise one or more servers 145 and corresponding databases 150 that might communicatively couple to the computing system 105a via one or more networks 155 (and in some cases, via one or more telecommunications relay systems 160, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 160 and the computing system 105a, between the one or more telecommunications relay systems 160 and each of at least one of the user devices 120, between the computing system 105a and each of at least one of the display devices 115, between the computing system 105a and each of at least one of the user devices 120, between the display devices 115 and the user devices 120, between the computing system 105a and each of at least one of the image capture device(s) 125, the microphone(s) 130, and/or the speaker(s) 135, between the display devices 115 and each of at least one of the image capture device(s) 125, the microphone(s) 130, and/or the speaker(s) 135, between the user devices 120 and each of at least one of the image capture device(s) 125, the microphone(s) 130, and/or the speaker(s) 135, and/or the like. According to some embodiments, alternative or additional to the computing system 105a and corresponding database 110a being disposed within user location 140, system 100 might comprise remote computing system 105b and corresponding database(s) 110b that communicatively couple with the one or more display devices 115 and/or with the one or more user devices 120 in the user location 140 via the one or more networks 155 (and in some cases, via the one or more telecommunications relay systems 160).

In some embodiments, the computing system 105a and/or 105b might include, without limitation, at least one of a client computer, a host computer, a user device, a server computer over a network, a cloud-based computing system, or a distributed computing system, and/or the like. According to some embodiments, remote computing system 105b might comprise at least one of a server computer over a network, a cloud-based computing system over a network, and/or the like. In some cases, the user devices 120 might include, without limitation, at least one of a laptop computer, a desktop computer, a smart phone, a mobile phone, a gaming console, a portable gaming device, and/or the like. In some instances, at least one of the user devices 120 might include, but is not limited to, a camera, a video camera, and/or the like, either as standalone cameras or video cameras or as cameras or video cameras that are built into other user devices (e.g., laptop computers, smart phones, mobile phones, etc.). In such instances, at least one of the user devices 120 might comprise at least one of the image capture devices 125.

In operation, the computing system 105a and/or 105b, the user device(s) 120, and/or the server(s) 145, or the like (collectively, "computing system" or the like) might establish projection of an input image onto a three-dimensional model, by which the computing system might: receive an input image comprising a face; determine an orientation, a size, and a location of the face in the input image; retrieve a three-dimensional model template comprising a face and a head; project the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and display (i.e., to the display screen 115a or the display device(s) 115, or to touchscreen display 120a of user device(s) 120, or the like) the three-dimensional model with the face of the input image projected onto the three-dimensional model. In some cases, the computing system might further rotate the three-dimensional model template comprising the face and the head to match the orientation of the face in the input image; scale the three-dimensional model template comprising the face and the head to match the size of the face in the input image; translate the three-dimensional model template comprising the face and the head to match the location of the face in the input image; and/or the like.

In some embodiments, the input image might be at least one of a photograph or a drawing. In the case that the input image is a photograph, the input image might be either captured with an image sensor of a device (e.g., an image sensor of at least one of the user devices 120, an image sensor of at least one of the image capture devices 125, an image sensor of a device that is remote from the user location 140, and/or the like) or retrieved from a database (e.g., database 110a, 110b, or 150, etc.). In a similar manner, audio (e.g., speech or other sounds, or the like) might be captured with the microphone(s) 130 or other audio capture devices (e.g., built-in microphone(s) or audio capture device(s) of user device(s) 120 (not shown), or the like), or the like, or might be retrieved from the database or a different database (e.g., database 110a, 110b, or 150, etc.).

In general, a face and facial features are located in the input image, the 3D model is retrieved, and the 3D model and image are iteratively adjusted until the facial features in the image and model geometrically match, with the geometry of the model (as projected onto the image) preferentially adjusted to match the underlying geometry of the face in the image, so that the end result—i.e., a synthetic 3D model—has both the visual and geometric appearance of the input face. Without limitation, however, the 3D model geometry need not necessarily be adjusted to the input image, and the input image could simply be adjusted to the model, in which case the end result will have the visual appearance of the input face, but the geometry of the model. Yet a third possibility is to do the latter and subsequently further adjust the face geometry parametrically, e.g., by making it longer or rounder, etc. The first approach that modifies both image and geometry is somewhat unique to the various embodiments described herein. The second approach that matches the image to the model is common in some apps. The third approach has been used in video games to create avatars.

Alternative, or additional, to establishing projection of an input image onto a three-dimensional model, the computing system might render images or morphs into animations of the three-dimensional models to cause the projected input image to simulate visual speech, by which the computing system might: parse a string of text into one or more allophonic units of a plurality of allophonic units; encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieve, from a codebook that is stored in a data store, a plurality of indexed images or morphs, each of the indexed images or morphs corresponding to a respective encoded point in the linguistic space, the codebook comprising an index of images or morphs; render the plurality of indexed images or morphs into an animation of the three-dimensional model; synchronize the animation of the three-dimensional model with an audio representation of the string of text; and output the synchronized animation (i.e., to the display screen 115a or the display device(s) 115, or to touchscreen display 120a of user device(s) 120, or the like) and the audio representation (i.e., to the speaker(s) 135 or other audio playback device(s), or to built-in speakers in user device(s) 120, or the like).

According to some aspects, although the various embodiments described herein are directed to speech-language therapy or the like, the techniques described herein (and the implementing hardware and software) may be used to enhance any two-dimensional or three-dimensional visual speech or affective facial expression representation. For instance, the various embodiments, may be applicable to animating two-dimensional or three-dimensional icons or avatars having faces (and/or heads) that may be used in social media applications, messaging applications, profile applications, street or bulletin signage, advertisements, video games, television programs, movies, or any other category of video representations, or the like.

In some embodiments, a 2D image of a selfie, photo, or graphic of a face(s) or similar likeness may be turned into a talking expressive 3D model(s). Functionalities enabled by such techniques might include, without limitation, taking a selfie or uploading a photo (or image) of a face then typing or saying text and watching the generated agent or avatar speak the typed or spoken text; using a user interface ("UI") to mark up the text with, e.g., <smile>, <sad>, <angry>, <blink>, <look_left>, <turn_right>, and/or the like, to create emotions and expressions in the generated agent or avatar; manually tagging eye and mouth points on a face or using automatic tagging if supported on the user's computer, mobile, tablet, TV, device, or browser, etc.; typing or speaking text and watching the generated agent or avatar say it; watching and hearing the generated agent say and express text or voice feedback automatically; and/or the like. The basic idea of the techniques described herein is that a 2D image that contains the likeness of a face(s) can be turned into a talking expressive 3D model(s) (of a generated agent(s) or avatar(s), or the like), with accurate visible or visual speech, expressive emotions, and eye and head gestures, and/or the like.

As described herein regarding the various embodiments, some of the key aspects include, without limitation, the manner by which the 3D model is mapped onto the image (e.g., 2D input image); the manner by which the polygon mesh (and the method as a whole) allows such mapping to be achieved; the manipulation of the polygon mesh (and/or the adjustment of parameters in the 3D model) to achieve or operationalize facial expressions, the movement of facial features (e.g., eyes, mouth, etc.), etc., without need to cut or stitch the input image; the manner by which emotions may be modeled (i.e., by utilizing such techniques to simulate affective facial expressions or the like); the manner by which the model can be used to render faces in web and mobile applications in real-time or near real-time; the manner by which specific markup language can be embedded within text to be spoken, and by which such markup language (e.g., as so embedded) can control actions that can be superimposed on top of each other or across time to control animation of the model (thus giving the effect that the character depicted in the input image is animated consistent with such control).

These and other functions of the system 100 (and its components) are described in greater detail below with respect to FIGS. 2-7.

FIGS. 2A-2I (collectively, "FIG. 2") are schematic diagrams illustrating various embodiments 200 for mapping a two-dimensional image onto a three-dimensional model for implementing three-dimensional facial modeling and visual speech synthesis. In a more general full 3D modeling scenario, where 2D mapping is not performed, the image would be a texture map, previously painted onto the 3D model, and subsequently unfolded and stretched into a 2D representation with conventional 3D modeling methods, then used to map the texture map onto the polygon mesh by associating points on the texture map with vertices on the model at rendering time. This is a very general, well established approach used in 3D modeling, video games, etc. FIG. 2, however, is directed to modeling that primarily applies to when a 2D image is mapped onto a 3D model.

In the non-limiting embodiments 200 of FIG. 2, an input image 205 might be received by a computing system. In some embodiments, the input image 205 might include a 2D image with a face or a likeness of a face in the image. The input image 205 might be any image type including, without limitation, a photo or photograph, a selfie, graphic art, painted art, a drawing, a video frame, and/or the like that contains a face (of a human) or a likeness of a face (e g, animal or object, or the like). The image must contain at least one face or likeness, but can contain more than one, and the method described herein is understood to apply to each face in the image separately.

Figure 2A:
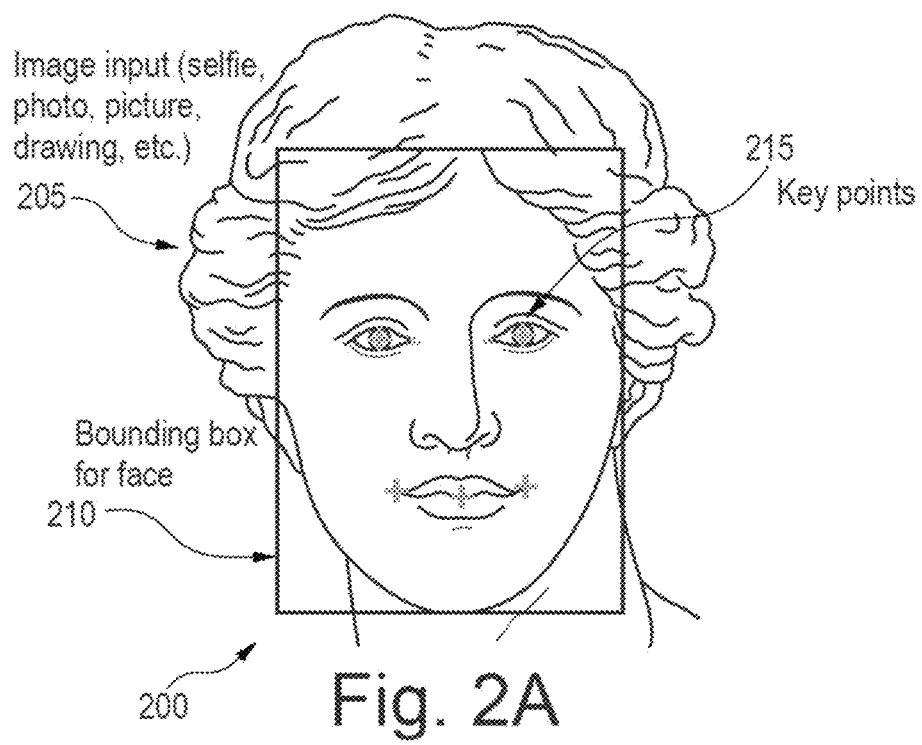

With reference to FIG. 2A, the computing system might perform automatic face detection, e.g., by using a bounding box 210 for a face in the image. The computing system might further perform automatic face key point detection within the region within the bounding box 210, with such key points 215 including, but not limited to, location of eyes, nose, mouth corners, lip edges, eye-brow, etc., in the image plane, etc.), and/or any other information (including, but not limited to, rotation or perspective transformations, and/or the like), as also shown in FIG. 2A.

Figure 2B:
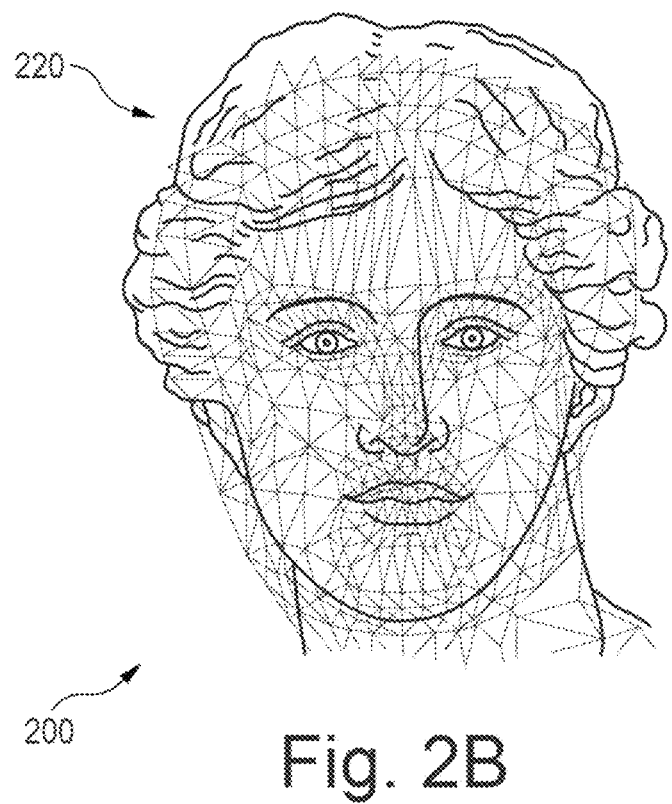
Figure 2C:
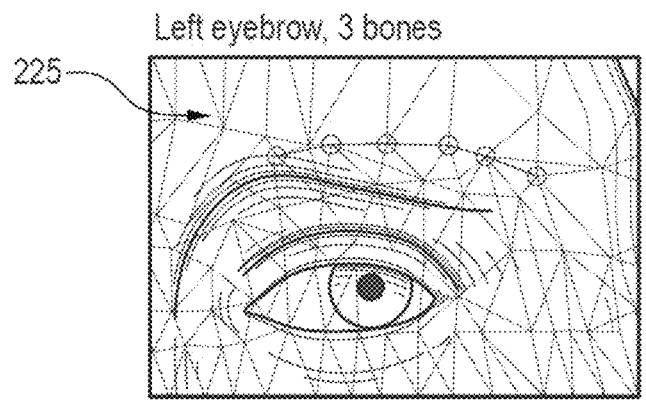
Figure 2D:
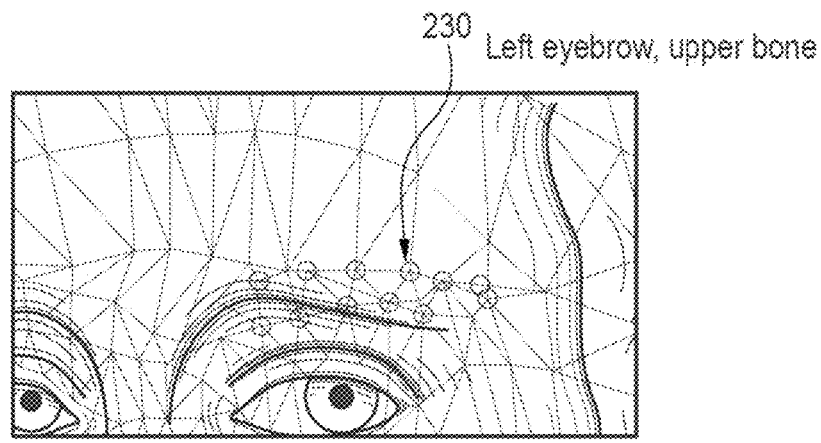

FIG. 2B depicts generation of a polygon mesh (either 2D mesh or 3D mesh) based on identification of facial features and/or the like within the input image. In this case, the polygon mesh is generated based on facial features, and/or the like that are identified in the face and head of the input image 205. In some instances, substructures or structures within the 3D model that can be treated as rigid might generally be referred to herein as "bones," or the like, although such a term is not limited to actual bones in the face or head (but is instead used herein as an animation term). The "bones" need not at all directly map onto actual physiological bones (as depicted in the input image), though in practice there tends to be a general correspondence between such "bones" and actual physiological bones. The polygon mesh 220 (representing the input image) may be used to establish projection of the input image 205 (or rather the polygon mesh 220 of the input image 205) onto a three-dimensional model, or may itself represent the three-dimensional model onto which some other input image (or polygon mesh of such other input image) is projected (e.g., as shown in FIG. 3B, in which the particular polygon mesh 220 of FIG. 2B is used as a 3D polygon model).

In the 2D image mapping method, the input image does not have vertices or bones that can be identified. Instead, in effect, a 2D projection of the 3D polygon mesh is positioned over the input image based on location, rotation, and/or scale of facial features. As noted below, separately in the 3D model, bones are linked to vertices using influence functions, and vertices are linked directly to points on a texture map, with the placement of bones and vertices in the 3D model determining the location, rotation, and/or scale of the facial features associated with the 3D model. The location, rotation, and/or scale of the bones, vertices, and/or model texture map may be adjusted while constrained by the influence functions until the location, rotation, and/or scale of the facial features in the input image and 3D model match, up to some tolerance. In the 2D image mapping method, the 3D model need not necessarily wrap around the head, and as such, could have a semi 3D appearance, akin to an embossed image.

When starting with a fully 3D model, similar to what is done in video games or movies, there is no input image, and the texture map (which might be a proxy for a 2D image) is scaled and stretched (usually when the model is developed) to the geometry of the 3D model as specified by the geometry of the polygon mesh, as opposed to the model being fitted to the 2D image as is done in the 2D image mapping method. The geometry of a fully 3D model is different from the semi 3D model used in the 2D image mapping method. FIG. 2 only depicts the semi 3D model and not the fully 3D model.

In both cases above, after fitting either the 3D model to the 2D image, or fitting the texture map to the 3D model, the geometry of the polygon mesh may still be controlled by an underlying bone model and/or bump map through influence functions, and subsequently adjusted to change the overall model geometry (e.g., width of the face) or to render specific morphs (e.g., to create facial expressions, head movements, or visible speech, and/or the like).

In some cases, the 3D polygon and bone model of the face and head might include, without limitation, the use of vertices, triangles, etc., in regions mapped or bounded using influence functions to corresponding rigid bones, or the like. In one non-limiting example, 421 vertices and 778 triangles in 72 regions are mapped or bounded using influence functions to corresponding rigid bones, or the like. Other configurations may also be possible. Bones might be organized and ordered in a hierarchical tree that models the dependencies between them. For example, changing the size of the left eye-socket, would correspondingly change the size of other bones associated with that socket using weighting functions, and would also change the size of the right eye-socket. In some embodiments, bones may be bounded to vertices in the left eyebrow region or the upper bone, for instance (see, e.g., FIGS. 2C and 2D, which depict three-bone region 225 of the left eyebrow (FIG. 2C) and the upper bone 230 of the region 225 of the left eyebrow 230 (FIG. 2D), or the like). Other bones in the face (or head, or other body part) of the input image may be similarly bounded to vertices, or the like, where weighting functions may similarly be used to change the size of such bones.

Figure 2E:
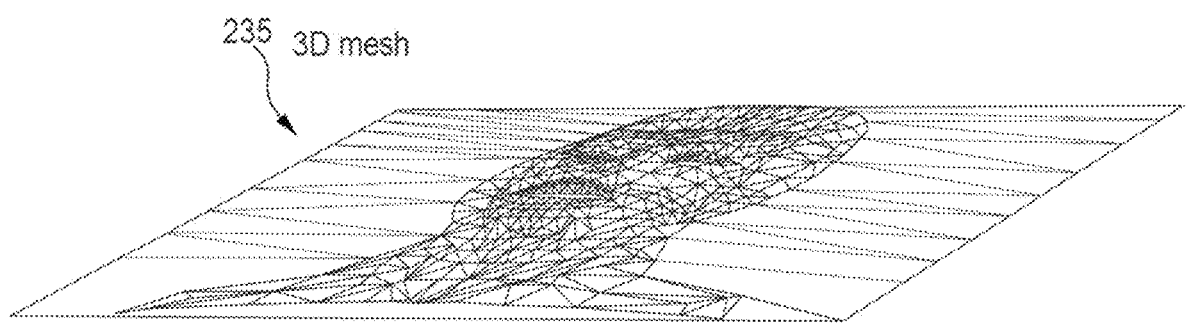

FIG. 2E depicts an example of a rotated and tilted partial 3D polygon mesh 235 for 2D to 3D image mapping. Other meshes suitable for different face geometries are also applicable. The polygon mesh for the 3D model that is used with the image mapping method and which forms a 2D surface that looks like and that is embossed or raised into a 3D space image should not be confused with the polygon mess for a fully 3D model, which is closed around the back of the head, and is fully 3D. Both types of models, however, may be used with the various embodiments, and the visual speech modeling in particular can be used with both types of models.

In some embodiments, the methods for facial modeling, emotion modeling, modeling expressions, implementing speech synthesis, and/or implementing one or more of such techniques on web and/or mobile devices, as described herein, can be applied both to the models used within the 2D image mapping embodiments and, more generally, to fully 3D models. That is, without limitation, the 2D image mapping approach represents one set of embodiments used to create a 3D model within which these one or more of these other methods can be applied. Starting with a fully 3D model represents another set of embodiments. FIG. 2F, for example, depicts an example of fully 3D agents and underlying models that may be used. With reference to FIG. 2F, non-limiting embodiments of carefully crafted 3D agents with accurate visual speech and caring affective expressions are shown. FIGS. 2G-2I illustrate (in partial screenshots) the 3D nature of a fully 3D version of a crafted agent from different viewpoints, exemplifying the point that agents can have a 3D likeness (if image mapped) or can be fully 3D.

Figure 3A:
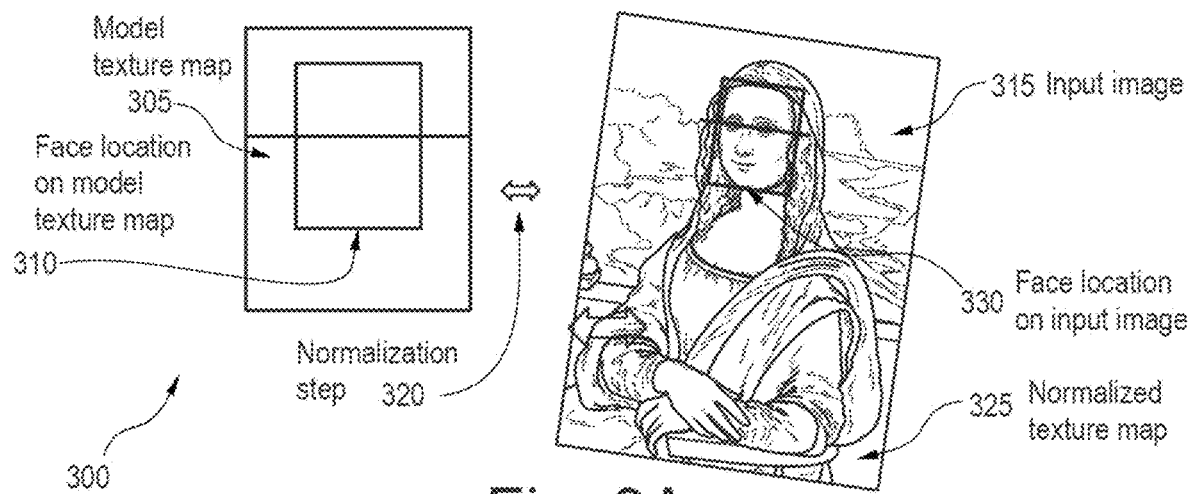
FIGS. 3A-3Q are schematic diagrams illustrating various embodiments for implementing three-dimensional facial modeling.
Figure 3B:
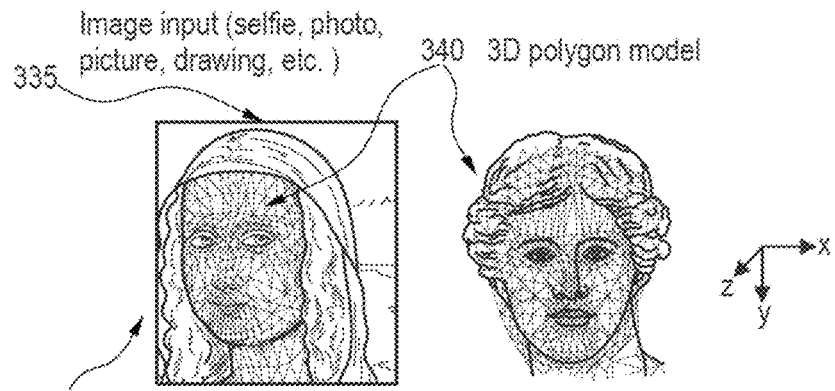
Figure 3C:
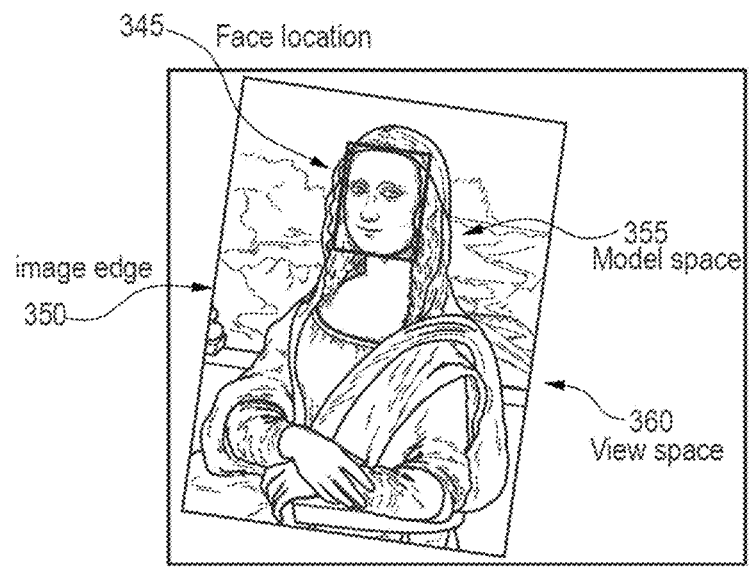
Figure 3D:
Figure 3E:
Figure 3F:
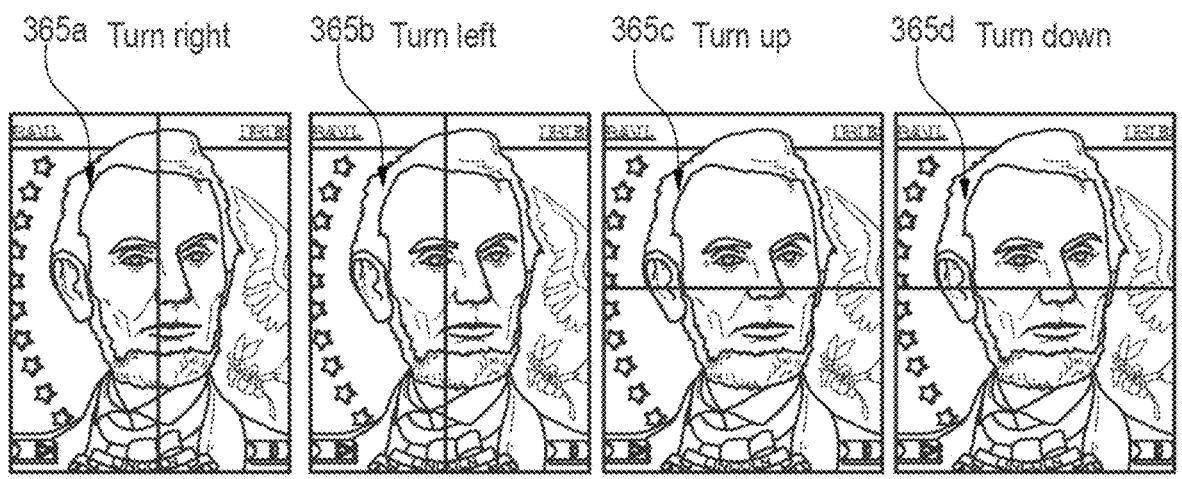
Figure 3J:
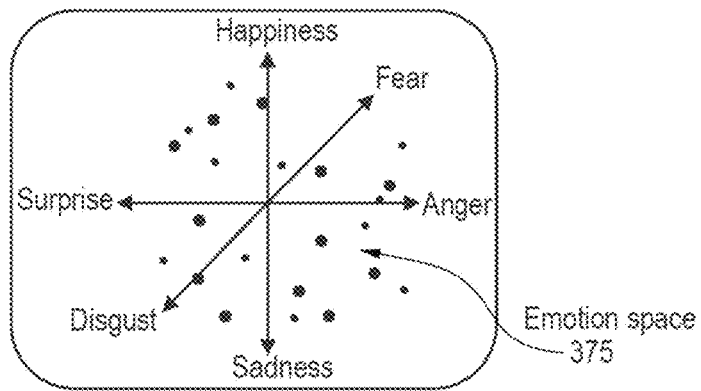
Figure 3K:
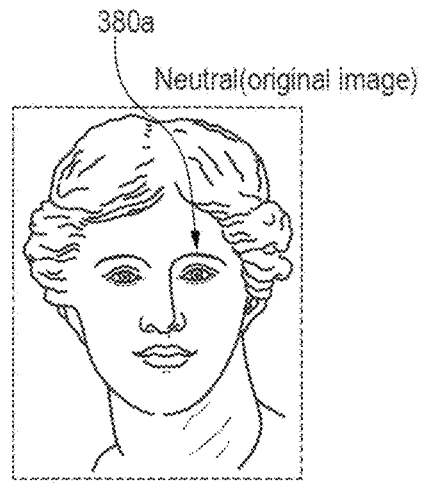
Figure 3L:
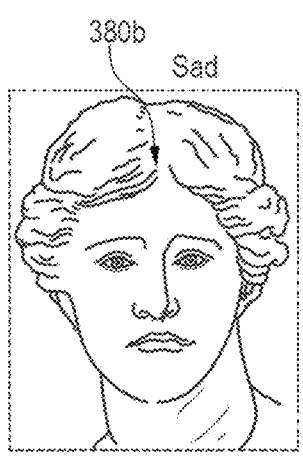
Figure 3M:
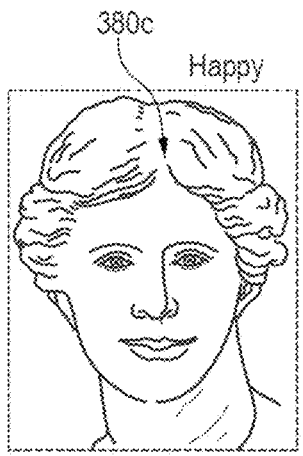
Figure 3N:
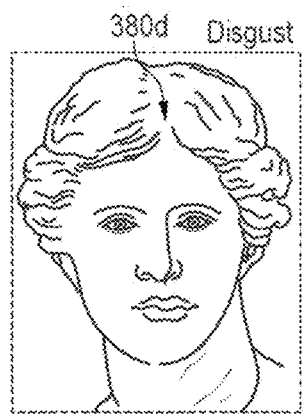
Figure 3O:
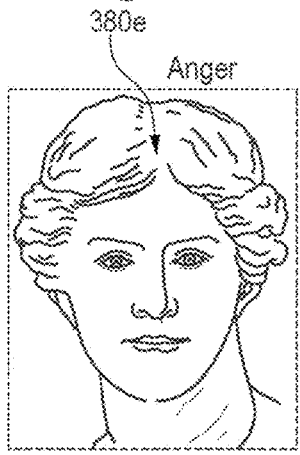
Figure 3P:
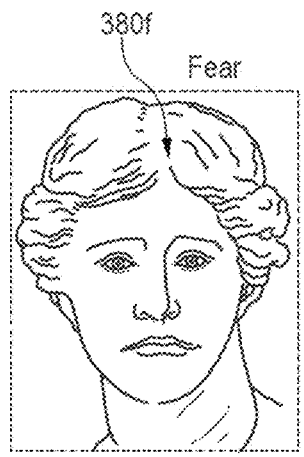
Figure 3Q:
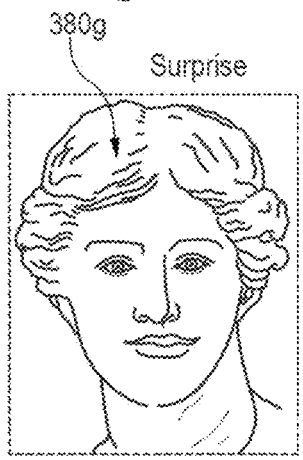

FIGS. 3A-3Q (collectively, "FIG. 3") are schematic diagrams illustrating various embodiments 300 for implementing three-dimensional facial modeling. FIGS. 3A-3C depict a non-limiting embodiment of a process of fitting a model face (e.g., the model face as shown and described above with respect to FIG. 2B, or the like) to a face in an input image (e.g., the input image as shown and described above with respect to FIG. 2A, or the like), while FIGS. 3D-3H depict various non-limiting embodiments of effects to the input image in response to manipulation of the model face, FIG. 3I depicts a novel specially shaped polygon mesh that may be used to enhance 3D modeling and rendering, and FIGS. 3K-3Q depict results of such manipulation to generate facial representations within the context of an emotion space as shown, e.g., in FIG. 3J.

With reference to embodiments 300, a goal might be to align the model face (including, but not limited to, vertices, bones, texture map, and/or the like) in an x-y projected space with the input image, so that the input image can be used as a new texture map that snaps to the model face in such a way that the model face adapts to the geometry of the input image, not the image to the geometry of the model. In some cases, for purposes of manipulating the model, bones might map to vertices, which might map to x-y points on the texture map, and in reverse, x-y points on the texture map might map to vertices that map to bones.

Referring to FIG. 3A, for instance, embodiments 300 might comprise a model texture map 305, which might have a face location box 310, and an input image 315. If perspective deformation (e.g., camera view point) is detected in the input image 315, a computing system might apply perspective transformations (after correcting for rotation) to the model 305 (including bones, vertices, vector morph targets, and/or the like). The computing system might subsequently normalize 320 the texture map 305 to generate a normalized texture map 325, by scaling, rotation, and/or translation transformations (as shown, e.g., in FIG. 3A, or the like), by: finding or locating the bounding box 310 for the face on the texture map 305; scaling the texture map 305 so that the bounding box 310 for the face on the texture map 305 fits the bound box 330 for the face in the input image 315; rotating the texture map 305 to match the orientation of eye alignment in the input image 315 (as depicted by the line through the bounding box 330 going through the eyes of the face in the input image 315, or the like); translating the scaled and rotated texture map 305 so that the bounding box 310 for the face on the texture map 305 is centered on the bounding box 330 for the face in the input image 315 (either centering on the eyes or the nose, etc.); and expanding the texture map 305 if necessary to ensure that the input image 315 is fully contained in the texture map, thereby generating a normalized texture map 325. In some embodiments, the model 305 might be updated to complete the initial fit, e.g., by applying the same scaling, rotation, and/or translation operations to all the other objects (if any) in the model, including, but not limited to, bones, vertices, vector morph targets, and/or the like.

According to some embodiments, the fit might be optionally iteratively or manually optimized for each x-y facial key point (e.g., key points 215 of FIG. 2 or the like), by: finding the vector difference between the point on the normalized texture map and input image. This might be the local translation error. If the key point is a centroid for a non-point feature, optimizing the fit might include finding the difference in rotation angle between the feature on the normalized texture map 325 and the feature on the input image 315, or the like. This might be the local rotation error. Similarly, optimizing the fit might include finding the difference between the relative size of the feature on the normalized texture map 325 and the corresponding feature on the input image 315. This might be the local scaling error. Alternatively, or additionally, the fit might be optionally iteratively or manually optimized for each x-y facial key point (e.g., key points 215 of FIG. 2 or the like), by: rotating, scaling, and/or translating the bones associated with the key point or feature to reduce the error(s). The same scaling, rotation, and/or translation operations may be applied to all the other objects in the model (including vertices, vector morph targets, etc.) that are associated with the key point and bones.

The process may be finished up, with reference to FIG. 3B, by: linking vertices to points on the input image 335 (e.g., photograph, drawing, or the like) by projecting onto shared x-y view space; scaling z-axis vertices for depth optimization to the type of image (optional); moving outer vertices to the image edge, for embedding the model in the image; and/or projecting, snapping, or freezing outer vertices in place on the x-y plane, for cropping and embedding the model 340 (e.g., 3D polygon model, or the like) within another background or image; and/or the like.

With reference to FIG. 3C, when aligning the model and image, and rendering the fitted model and image, the method performs transformations between the model (with face location 345 and image edge 350 or the like) in the model space 355 and the view/world space 360. Camera orientation, perspective transformation, clip space (not shown), and screen space (not shown) operations may be considered.

FIGS. 3D-3H depict various non-limiting embodiments of effects to the input image in response to manipulation of the model face. Although the head is embedded in the image, because it has been mapped onto a 3D model, it can be manipulated. For example, as shown in FIGS. 3D and 3E, after the image of the painting of the Mona Lisa has been mapped to a 3D model, the face of Mona Lisa can be manipulated. For instance, the image of Mona Lisa can be made to frown in sadness (as shown, e.g., in FIG. 3D, or the like) or to speak (as shown, e.g., in FIG. 3E, or the like). Similarly, as shown in FIGS. 3F-3H, after the image of the face and head of Abraham Lincoln as depicted on the front of the U.S. five-dollar bill has been mapped to a 3D model, the face and head of President Lincoln can be manipulated. For instance, the image of President Lincoln can be made to turn right 365a, turn left 365b, turn up 365c, or turn down 365d, as shown in FIG. 3F, in which vertical and horizontal lines are superimposed on the image to more clearly shown the turns of President Lincoln's head. FIG. 3G depicts various other manipulations of the face and head of President Lincoln, while FIG. 3H depicts gaze manipulation (e.g., to the left and to the right, etc.) of the image of President Lincoln.

To accomplish the facial manipulation of the images of Mona Lisa and President Lincoln, all major components of the face—including, without limitation, the eyes, eye brows, nose, cheeks, upper forehead, lips, chin area, neck, and/or the like—in the respective input images might be parameterized within the model using vector morphs. In this manner, it is possible to parametrically control any of these features to cause the subject of the images smile, frown, wink, speak, raise an eyebrow, blink, gaze in different directions, etc. In particular, to model gazing using the original eyes in the image, the polygon mesh in the eye region might be warped and/or folded. The model might use a novel specially shaped polygon mesh 370 that allows the original eyes from the image to be animated without having to cut the image or substitute artificial eyes, as shown, e.g., in FIG. 3I.

Merely by way of example, in some embodiments, components of the face—including, without limitation, the eyes, eye brows, nose, cheeks, upper forehead, lips, chin area, neck, and/or the like—may be parameterized to achieve affective facial expressions (i.e., facial expressions relating to emotions or moods of a person, or the like). The six basic emotions of happiness, sadness, disgust, fear, surprise, and anger are modelled as opposing and multi-axial morphs in a continuous additive space, optionally sampled on a grid and/or represented with vector morphs, e.g., as shown in FIG. 3J (which depicts an emotion space 375 consistent with such a model). Susskind, Anderson, et al., Neuropsychologia, 2007, showed that there may be an evolutionary basis for considering emotions to be opposing. The approach makes it possible to parametrically and smoothly control emotions, including level of valence, amount of blending if any (e.g., anger+sadness, etc.), as shown, e.g., in FIGS. 3K-3Q. A research study found that emotions synthesized using the methods described herein are state-of-the-art with regard to accuracy and consistency of perception. In the study, healthy elderly individuals were able to discern differences in emotions and valence when expressed in prompts. In addition to the basic six emotions, other emotions and expressions (e.g., various forms of empathy, or the like) can be synthesized. With reference to FIGS. 3K-3Q, parameterizing or adjusting parameters of components of the face of a neutral or original input image 380a (FIG. 3K), the face in the image can be manipulated to express sadness 380b (FIG. 3L), happiness 380c (FIG. 3M), disgust 380d (FIG. 3N), anger 380e (FIG. 3O), fear 380f (FIG. 3P), or surprise 380g (FIG. 3Q), or the like.

Conventionally, the default might be to use an input image with a face having the mouth closed. To synthesize visual speech, in such cases, might require cutting the image between the lips to create a hole that can be joined to a synthetic mouth sock, teeth, and tongue. The method as described herein, however, can animate visual speech without cutting the image, assuming that the input image captured the mouth open. In that case, a similar wrap-around, warping, and/or folding method (as shown and described above with respect to FIG. 3I, with regard to modeling gazes, or the like) might be used, allowing visual speech to be synthesized using the original mouth. Visible speech or visual speech may be synthesized using methods described below with respect to FIG. 4, or by any other suitable methods.

The method of mapping and/or manually editing mappings, as described herein, may be implemented on computer, web, and/or mobile platforms, as computer, web, and/or mobile applications (collectively, "software applications" or "apps" or the like), and the method for turning a 2D image into a 3D model can be performed either on-device or externally on a server, or the like. Controls, user interfaces ("UIs"), application programming interfaces ("APIs"), and/or the like may be available for automatic and/or manual mapping on the computer, web, and/or mobile platforms.

The method for rendering images or morphs, as described herein, may likewise be implemented on computer, web, and/or mobile platforms, as computer, web, and/or mobile applications. Animation may be controlled on-device or externally on a server, or the like. On-device and in the software applications, the model and morphs may be combined, interpolated, and/or rendered at the device-supported frame rate, or the like. For computer or mobile devices, OpenGL or the like may be used to render 3D models, while for web applications, HTML5 and WebGL (or the like) or pure images (or the like) may be used to render 3D models or 2.5D approximations, respectively. Other rendering engines, including, but not limited to, Flash or Unity, and the like, may also be used.

According to some embodiments, markup language might be used for micro and affective expressions, head movements, other facial manipulations, or the like. In some cases, a key-value based notation may be used. Any similar parametric key-value based notation could also be used. In some embodiments, specifying the amount of an action might comprise setting up the amount of the action by specifying a number with the tag name (e.g., "<smile=100>"; "<sad=5>"; "<turn_left=120>"; etc.). A recommended valence for an emotion, expression, or movement might be a value of 100 (or the like), although the program might allow users to use values that are greater than or smaller than 100. In some instances, a value of "0" might mean "no action," while some actions might have not values (e.g., a blink action does not have an amount and thus the amount information can be ignored).

For visual speech, transition behavior might be specified to achieve a more natural or more human interaction between the manipulated image or morph and a user. To achieve this effect, the program might automatically insert a neutral tag at the start and at the end of each sentence. The program might then interpolate in time between any other tags inserted within the text string to be animated or spoken. Tags for different actions (e.g., blink and smile, etc.) might operate in independent channels, while tags for the same action might be interpolated in time. Interpolation points might be between words ("wd"), where the tag might be specified. The default duration for most tags might be "all the words from when it is specified to the end of the sentence." For example, "READ THE SENTENCES ALOUD <top_eyelid=100> PRESS THE SPACE BAR AS SOON AS YOU ARE DONE" might start an action at word READ that closes the top eyelids between the words ALOUD and PRESS, and might keep them closed for the remaining words in the sentence, opening them again at the end after the word DONE. "READ THE SENTENCES <top_eyelid=0> ALOUD <top_eyelid=100> PRESS THE SPACE BAR AS SOON AS YOU ARE DONE" might close the top eyelids during the word ALOUD so that they are closed that the start of the word PRESS, and might keep them closed for the remaining words in the sentence, opening them at the end after the word DONE. "READ THE SENTENCES ALOUD <top_eyelid=100 duration=1wd> PRESS THE SPACE BAR AS SOON AS YOU ARE DONE" might start an action at word READ that closes the top eyelids fully between the words ALOUD and PRESS, and might keep them closed during the word PRESS, transitioning back to neutral by the end of the word DONE. "READ THE SENTENCES <top_eyelid=0> ALOUD <top_eyelid=100> PRESS <top_eyelid=0> THE SPACE BAR AS SOON AS YOU ARE DONE" might closee the top eyelids during the word ALOUD so that they are closed at the start of the word PRESS, and might open them fully by the start of word THE. "READ THE SENTENCES <top_eyelid=0> ALOUD <top_eyelid=100 duration=6wd> PRESS THE SPACE BAR AS SOON AS YOU ARE DONE" might close the top eyelids during the word ALOUD, might keep them closed for the next 6 words through word SOON, and might start to open them by the final word AS, finishing the action at the end after the word DONE. "READ THE SENTENCES <top_eyelid=0> ALOUD <top_eyelid=100 duration=6wd> PRESS <top_eyelid=0> THE SPACE BAR AS SOON AS YOU ARE DONE" might close the top eyelids during the word ALOUD, might open them at the end of PRESS (interrupting the 6wd action), might then move to close them again by the word SOON (continuing the previous 6wd action), and might start to open them by the final word AS, finishing the action at the end after the word DONE.

FIGS. 4A-4L (collectively, "FIG. 4") are schematic diagrams illustrating various embodiments 400 for implementing visual speech synthesis.

The method for visible speech is grounded in the science of linguistics and phonetics—i.e., the study of how sounds are produced as the various organs of the mouth move, manipulate and restrict airflow from the lungs, and how they are realized acoustically.

To develop the animated agent, and visible or visual speech in particular, about a hundred composite prototypical exemplars (images or morphs) were used as anchor points in a visual space that spans the range of normal visual speech, with the majority of images representing small areas on the face, in particular the mouth area. Where applicable, the words "image" (which applies to two-dimensional constructs) or "morph" (which applies to three-dimensional constructs) will be used interchangeably, given that the underlying technique applies to both two-dimensional images and three-dimensional morphs. The methods described here are not to synthesize auditory speech, but instead to produce visual speech in which the mouth movements align well with pre-synthesized or pre-recorded speech.

Because adjacent sounds often influence each other, in a process called co-articulation, they cannot be considered in isolation. English sounds both sound and look different when spoken in context (e.g., consider the vowel in "bang" and "bat"). To capture the visual and articulatory variability in spoken English, it is necessary to consider the place, manner, and position of the speech articulators, paying careful attention to how they affect each other when vowel and consonant sounds are spoken in context. To do this, images and video sequences of carefully selected combinations of spoken phonemes, syllables, and words were collected and analyzed to better understand these influences. Based on the video and image data, the morphological and anthropometric considerations, the physiological constraints, and the linguistic and phonetic characteristics, about a hundred prototypical exemplars of the mouth, lip, and tongue positions were carefully designed and selected to be used as code-book entries that span a continuous visual space, making this approach different from other approaches for generating visual speech, e.g., motion capture, video stitching, video/motion capture concatenation, parametric modeling of the articulators, statistical sequence modeling, filtering, viseme modeling, etc.

Figure 4A:
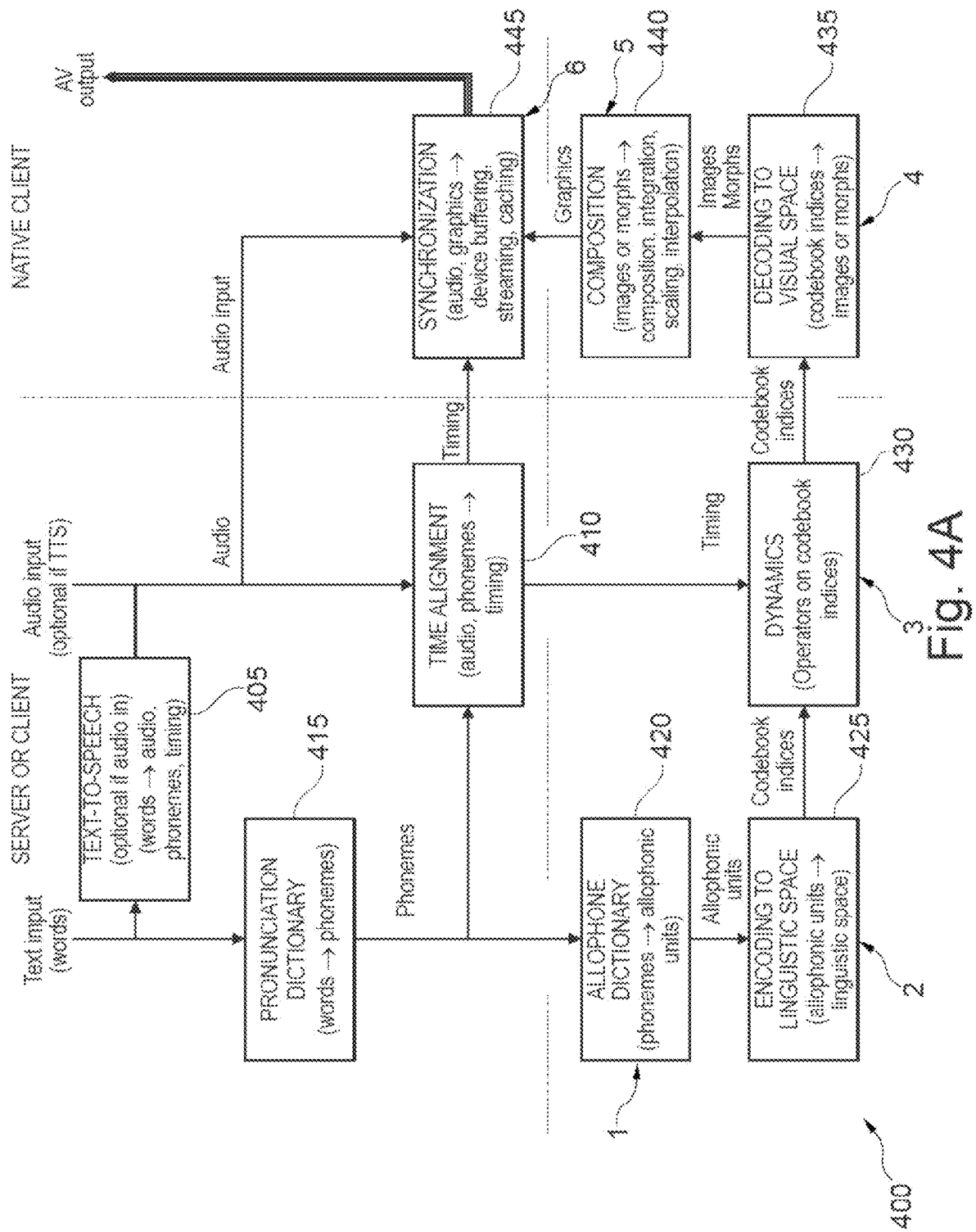

FIG. 4A shows the process for generating visual speech. While pronunciation dictionaries, text-to-speech, and time-alignment have been used previously to generate and model both auditory and visible (or visual) speech, to the knowledge of the inventors, the other aspects of the proposed method are unique, and each are detailed in the following paragraphs.

For text-to-speech or time alignment (at blocks 405 and 410, respectively, of FIG. 4A), animation starts with a text string of words to be spoken and corresponding time-aligned audio generated using a text-to-speech engine or pre-recorded speech aligned with a speech recognizer.

A pronunciation dictionary (at block 415 of FIG. 4A) may be used to map words to phonemes ("P"). For convenience, and compatibility with common speech recognition and processing methods, the ARPABET phoneme representation is used (although the various embodiments are not limited to use of the ARPABET phoneme). For example:

"word"→/$P_1\ P_2\ P_3\ P_4\ P_5\ \ldots$/.

An allophone dictionary (at block 420 of FIG. 4A) may be used to map a sequence of phonemes Pi into a sequence of allophonic units Uj, which provides a contextually appropriate linguistic target for speech production. The mapping from each phoneme to each allophonic unit is one to many. In general, any unit that captures the co-articulatory influence of adjacent phonemes on each other can be used, including, but not limited to, n-tuples of phonemes, onset and rime units (where the onset unit is the initial phonological unit of any word, while the rime unit is the string of letters that follow; not all words have onset units), and syllables.

For example, the following uses diphones (i.e., adjacent phoneme pairs) to approximate allophonic variations. Letting "*" represent "non-interacting" left or right phoneme contexts, a phoneme sequence can be mapped to a corresponding sequence of allophonic units. For example:

$$/\ P_1\quad P_2\quad P_3\quad P_4\quad P_5 \ldots \quad /\rightarrow$$
$$\{*\_P_1\_*,\ P_1\_P_2\_*,\ *\_P_3\_*,\ *\_P_4\_P_5,\ P_4\_P_5\_*,\ \ldots\} =$$
$$\{\ U_1\quad U_2\quad U_3\quad U_4\quad U_5\quad \ldots\quad\}.$$

Figure 4B:
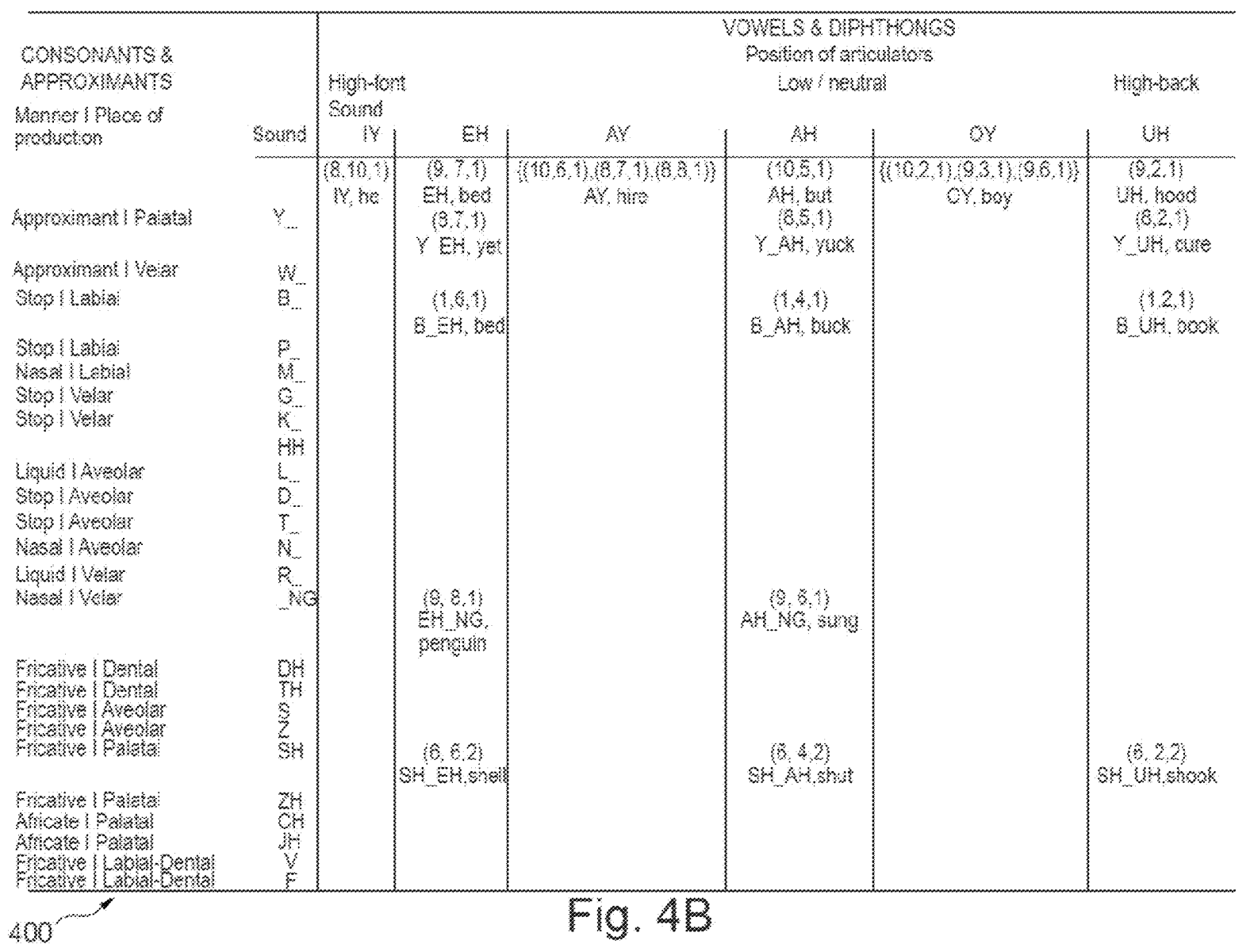

Each allophonic unit is assumed to map to a point or trajectory in linguistic space (at block 425 of FIG. 4A). In this sense, the model's use of segmented trajectories is somewhat similar to segmental models used previously in speech recognition, though the space that is being mapped into and the operations applied to the trajectories differ significantly. In general, the mapping need not be to a specific location, recognizing that for many reasons, speech production is highly variable, both within and between speakers. The linguistic space loosely represents the range of mouth movement in three-dimensions, as characterized by allophones, with $x=v_1$ representing mouth openness, $y=v_2$ representing mouth roundness, and $z=v_3$ representing lip protrusion. Additionally, teeth separation is modelled in a fourth dimension with $v_4$ representing upper versus lower teeth separation; and tongue position in a fifth dimension, with $v_5$ representing tongue position. These parameters, with the exception of tongue position vary smoothly across these dimensions, but not linearly, the latter allowing fine nuances in visual speech to be compactly presented within this space without increasing its operational dimensionality. For ease of modeling, the space spanned by the first three dimensions $v_1$, $v_2$, and $v_3$ may be quantized on a non-linear grid, covering only the convex region within which allophonic units are expected to map into and operate in. Each grid position represents a code-book index. The center of the grid represents a neutral, relaxed mouth. Organizing consonants and vowels into a unified space in which they can influence and interact with each other, as show in FIG. 4C, and exemplified in FIG. 4B, is new. FIG. 4C depicts the act of combining consonants and vowels, using established methodologies for each, into a conceptual space, which is exemplified in the table in FIG. 4B. The table in FIG. 4B as listed, however, is not complete, but is merely provided to serve as an illustration of the concept. A complete table (not shown) has many more entries.

For example, a sequence of allophonic units may map into this space onto grid positions (code-book indices):

$$\{\ U_1 \quad U_2 \quad U_3 \quad U_4 \quad U_5 \ ...\ \} \rightarrow$$
$$\{(2,3,1), \quad (2,5,1), \quad \{(1,5,2), (1,6,2)\}, \quad (1,3,2), \quad (1,4,1), \ ...\ \},$$

where all units are mapped to points, except for the third unit $U_3$, which is mapped to a trajectory connected by the two points $\{(1,5,2), (1,6,2)\}$. In general, stationary sounds, or portions of sounds, (such as vowels) map to points, while transient sounds (such as diphthongs (i.e., sounds formed by the combination of two vowels in a single syllable) and plosives (which in English might be t, k, and p (voiceless) and d, g, and b (voiced) sounds)) map to trajectories. The above example describes mapping into a 3 to 5 dimensional linguistic space. The method in general extends to higher dimensional spaces as well, noting that additional parameters can be introduced to describe the mouth, speech articulators, and linguistics, and each can be embedded into the linguistic space and code-book in a similar manner as described above.

FIG. 4B depicts a table illustrating how the mapping into linguistic space (as shown in FIG. 4C)—if quantized on a grid or mesh—can be unfolded into a two-dimensional table with the vertical axis organized by consonant sounds and the horizontal axis organized by vowel sounds. With reference to FIG. 4B, numbers in the table relate to (X,Y,Z) grid positions in linguistic space, for a grid quantized into up to 12 values per dimension. Without loss of generality, for purposes of presentation, only selected allophone combinations that form selected vowels are shown in the table of FIG. 4B. A larger list of vowels might include, without limitation, AA, AE, AH, AO, AW, AX, AXR, AY, EH, ER, EY, IH, IX, IY, OW, OY, UH, UW, and more than 400 allophonic combinations may be represented in a full table (not shown), which can be further expanded to include allophonic combinations using onset-rime, syllable, and other units as needed. Entries in the table depict a point or trajectory described by points in the linguistic space, the specific allophone or sound combination being described, and an example of a word containing the allophone being provided. The numbers in the table of FIG. 4B (or similar table) can be used as code-book indices, or the like.

FIG. 4C depicts a design of a linguistic space. Using linguistic, physiological, and morphological characteristics of consonants and vowels, and interactions among them, the consonants organized by place and manner of production 450 may be combined with vowels, semi-vowels, and diphthongs, organized by position of articulators 455 and roundness of lips, to form a new organizing (linguistic) space 460 that emphases allophonic variation.

Because movement of the articulators are continuous, the visual realization of speech must be continuous too. Over time, this means that the allophonic units trace continuous trajectories within the linguistic space. The specific mapping into linguistic space, and the trajectories traced by allophonic units, may be determined, among other factors, by a combination of how the allophonic units map linguistically into this space; their relative location in the space; physiological and morphological constraints related to individual mouth and face shape and geometry; dynamic range, non-linear motion, and rates of acceleration of the articulators; speaking rate and speaking mannerisms; etc.

The design of the linguistic space allows for easy and explicit manipulation of speech dynamics (at block 430 of FIG. 4A). For example, to model long-term variability, and static within-speaker characteristics, scaling and translation operations are applied to the code-book indices. To model short-term speech variability, articulatory unit specific weighting and similar operations are applied to individual and adjacent codebook indices.

Operations are applied separately and differently to each dimension. In general, operations force a close correspondence between allophonic units and position on the x-dimension (openness); for example, to produce the phoneme/M/ the lips must touch. In contrast, operations force a looser correspondence between allophonic units and position on the y-dimension (roundness), which is more strongly related to co-articulatory and allophonic variation. And in general, although it is somewhat phoneme specific, for transitions between two points in the linguistic space, trajectories are loosely constrained to traverse the x-dimension before the y-dimension. Modifying the trajectories—and how accurately points are maintained after transformations —, as well as dropping points, make it possible to model speaking styles that vary from slow and over-enunciated to fast and lazy.

For example, operations may map the sequence of code-book indices:

$$\{(2,3,1), (2,5,1), \{(1,5,2), (1,6,2)\}, (1,3,2), (1,4,1), ... \} \rightarrow$$
$$\{(2,4,1), (2,5,1), \{(2,5,2), (1,4,2)\}, (2,3,2), (1,4,1), ... \},$$

where each element corresponds to a visual realization aligned in time $\{t_1, t_2, \{t_3, t_4\}, t_5, t_6, ... \}$ with the audio to be spoken. The time steps are variable and not quantized to a particular rate, and instead correspond to the occurrence of salient events in speech. Finally, indices corresponding to teeth and tongue positions are appended to each tuple as appropriate.

For decoding to a visual space (at block 435 of FIG. 4A), after applying operations in linguistic space, transformed code-book indices may be used to retrieve, from a compressed code-book, an image or morph corresponding to a visual realization of that index's location in linguistic space.

For composition and synchronization (at blocks 440 and 445, respectively, of FIG. 4A), images or morphs may then be uncompressed, assembled, partitioned, blended, and/or super-imposed into streams of images and morphs, with accompanying geometry, texture, color, location, perspective, and/or lighting information, as appropriate, together representing the full face to be rendered as key frames at a non-linear variable rate, and aligned in time with the audio (as shown in FIG. 4D, or the like). FIG. 4D depicts synthesis of visual speech at non-linear variable rate 465, with decoding to variable-resolution 470, and hierarchical, sub-partitioned super-imposed streams 475 of image and/or morph data. If morphs are used, interpolation between key frames can be applied by the rendering engine.

Because images or morphs are indexed in the abstract linguistic space, each index can refer to images at multiple resolutions, and/or of different characters, and each index can represent morphs of different sizes and characters, effectively decoupling visual speech modeling and character animation.

With reference to FIG. 4A, in some embodiments, the processes at blocks 405-430 might be performed at a server or remote client (e.g., computing system 105b of system 100 of FIG. 1, or the like), while the processes at blocks 435-445 might be performed on the native or local client (e.g., computing system 105a of system 100 of FIG. 1, or the like)—the processes at blocks 420-440 (also denoted as blocks 1 through block 6 in FIG. 4A) corresponding to visual speech animation processes. Alternatively, the processes at blocks 405-445 might be performed (as a whole) either at the server (or remote client) or at the local client (not shown).

For rendering, the resultant sequence of indices are used to recover from the code-book a sequence of high-dimensional morphs (or static images, depending on the application) of the mouth, lips, teeth, and tongue, to be interpolated and rendered at the device-supported frame rate. For computer or mobile devices, OpenGL may be used to render 3D models, whereas for web applications, HTML5 and WebGL or pure images may be used to render 3D models or 2.5D approximations, respectively. Versions for Flash (deprecated) and Unity may also be used.

A brief review of articulatory phonetics is provided as follows to give context to the three-dimensional facial modeling and visual speech synthesis, as described herein. As an initial matter, visible or visual speech can be grounded in the science of articulatory phonetics—the study of how phonemes are produced as the various organs of the mouth move, manipulate and restrict airflow from the lungs, and how they are realized acoustically. The following provides a short review of these well-known basic principles.

Figure 4J:
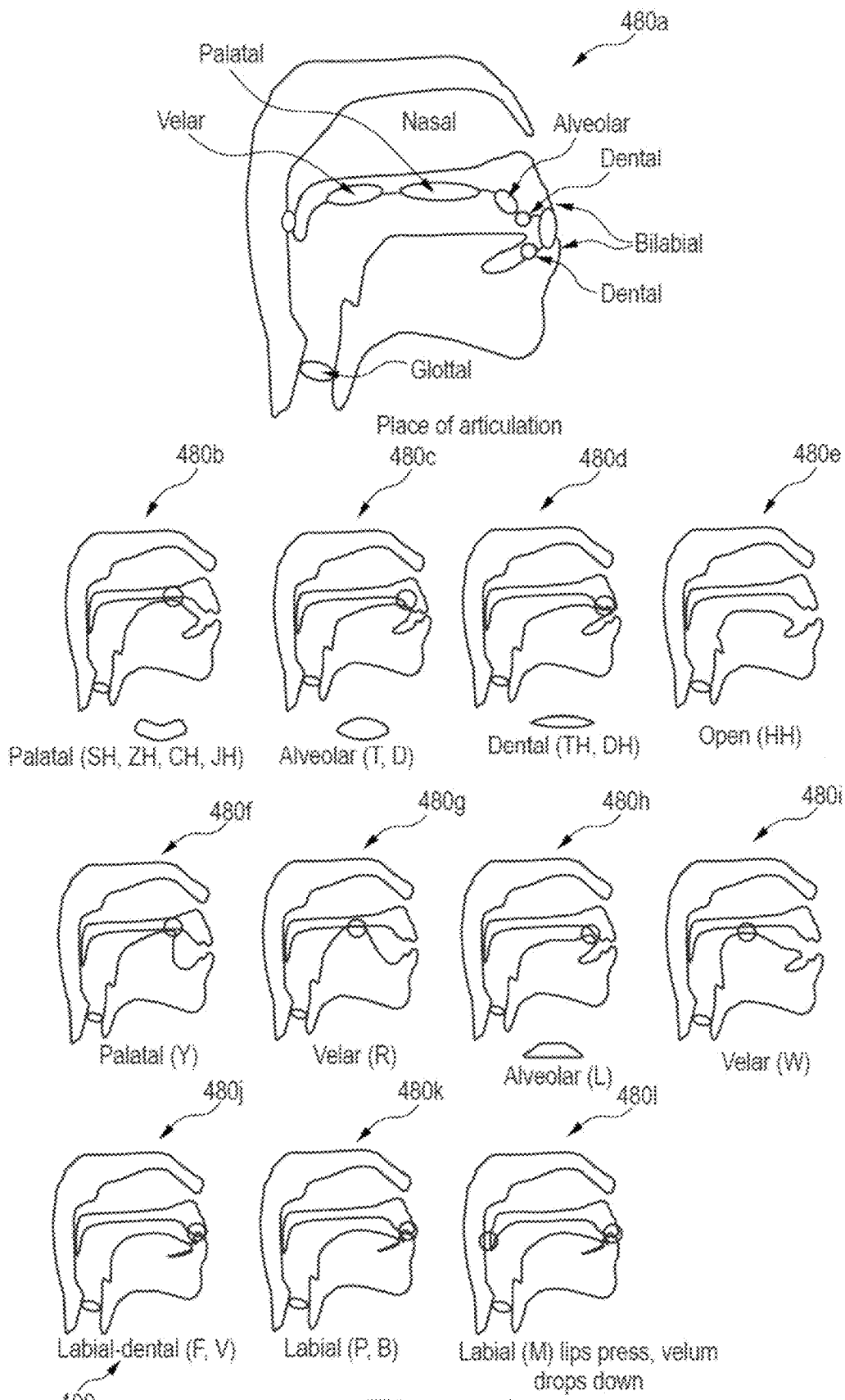

FIG. 4E lists in table form English consonants that are modelled. For simplicity, the sounds are listed using the ARPABET convention commonly used with computational approaches. Consonants in the English language can be distinguished by place and manner of articulation. Place specifies where the restriction of airflow occurs and manner specifies the amount of obstruction. FIG. 4J shows the different places (e.g., Velar, Palatal, Nasal, Alveolar, Dental, Bilabial, Glottal, and/or the like) where articulation can be constrained as shown with respect to embodiment 480a, with specific examples detailed with respect to embodiments 480b-480l in FIG. 4J (i.e., Palatal (SH, ZH, CH, JH) 480b, Alveolar (T, D) 480c, Dental (TH, DH) 480d, Open (HH) 480e, Patal (Y) 480f, Velar (R) 480g, Alveolar (L) 480h, Velar (W) 480i, Labial-dental (F, V) 480j, Labial (P, B) 480k, Labial (M) where lips press and velum drops down 480l, and/or the like). The details of place and manner of articulation for different consonants are summarized in the tables of FIGS. 4F-4H (which show consonants in English grouped by place and manner of articulation (FIG. 4F), English consonants and place of articulation (FIG. 4G), and English consonants and manner of articulation (FIG. 4H)).

Figure 4K:
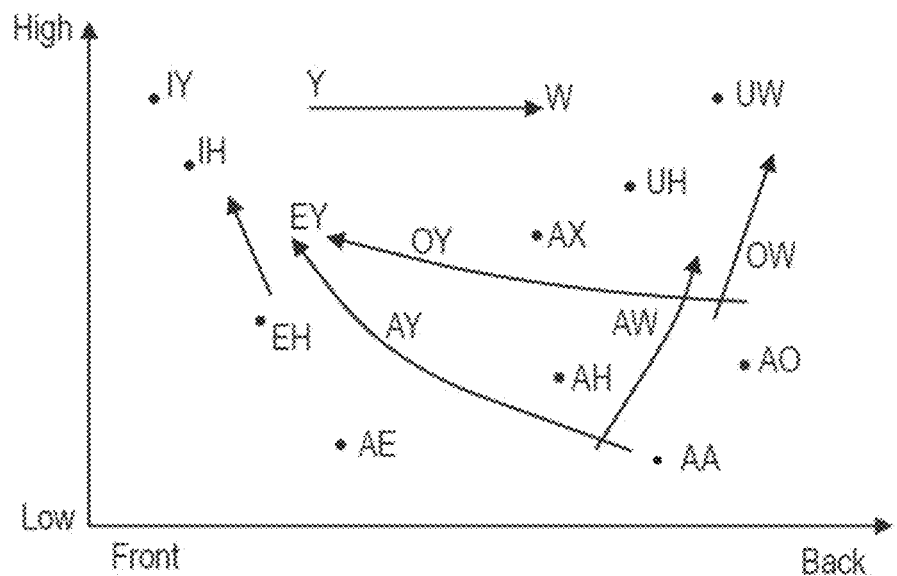
Figure 4L:
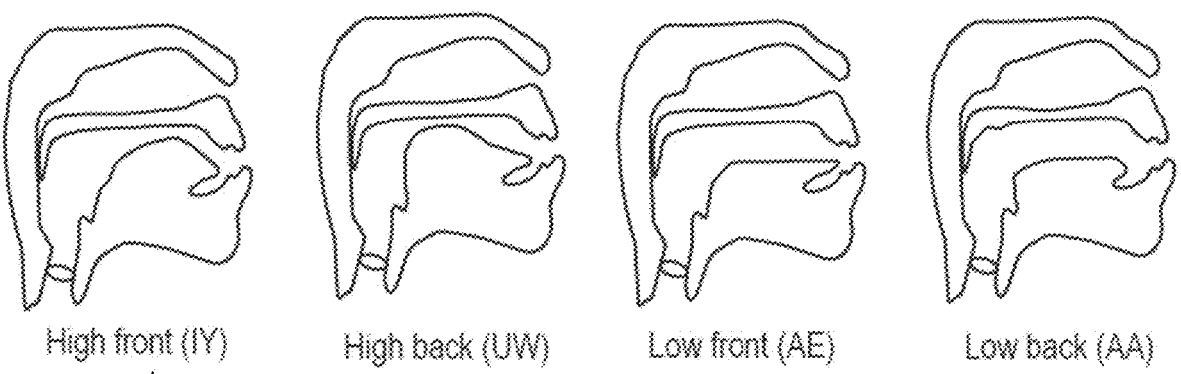

Vowel sounds in the English language can be distinguished by position of the articulators—upper or lower height of tongue, front, or back position of tongue and roundness of lips. FIG. 4I lists in table form English vowels, semi-vowels, and diphthongs. When organized according to the position of the articulators on a so-called vowel chart, relationships between the vowels become apparent. FIG. 4K shows this relationship for tongue position of different vowels, semi-vowels, and diphthongs. FIG. 4L shows specific examples of vowel tongue position (e.g., High front (IY), High back (UW), Low front (AE), and Low back (AA), or the like).

Figure 6A:
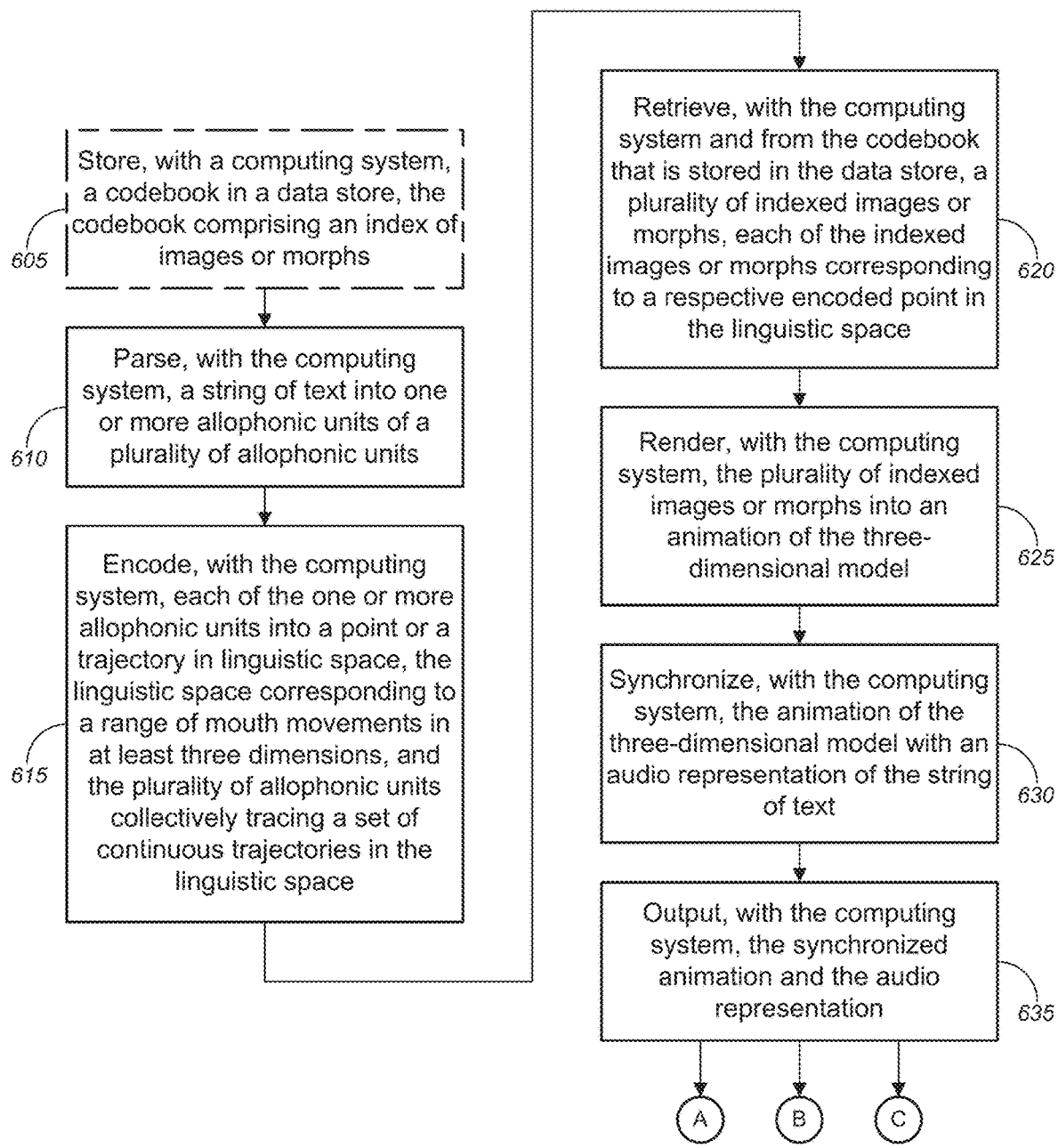
Figure 6E:
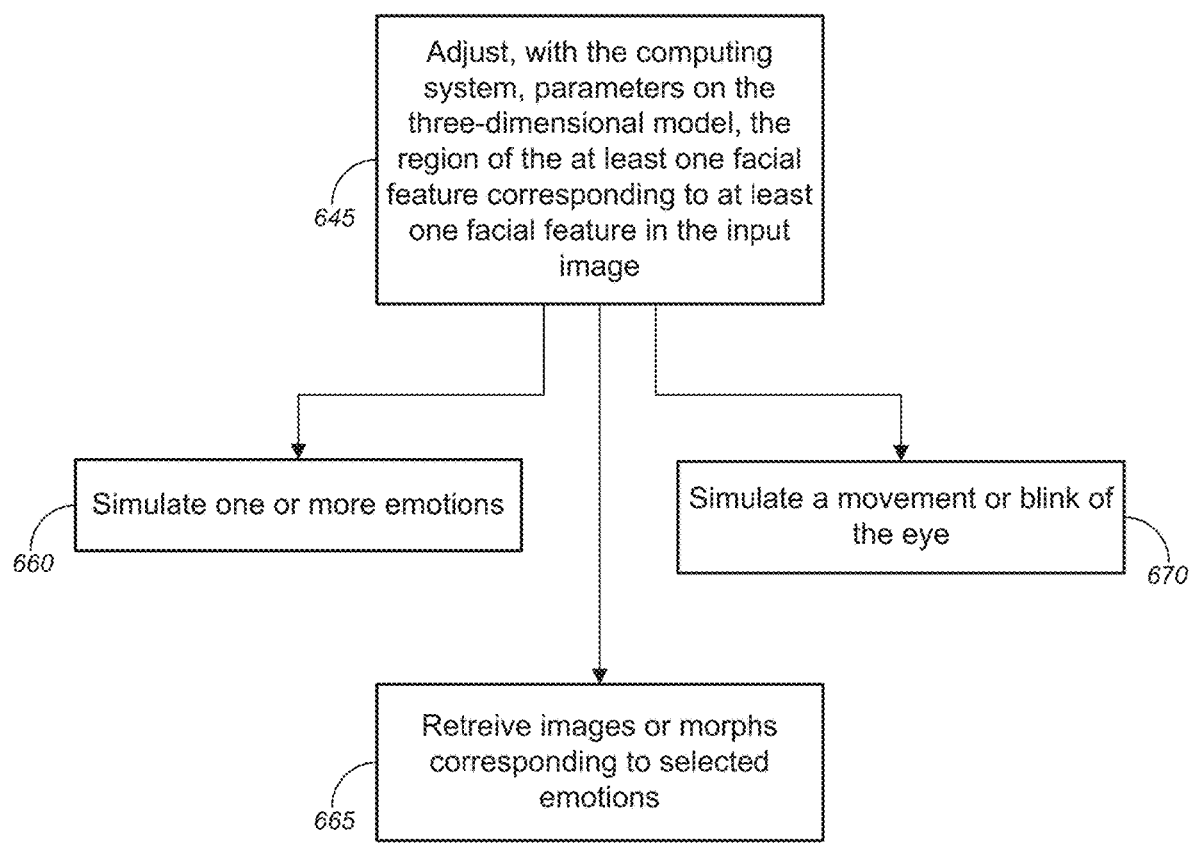
Figure 7A:
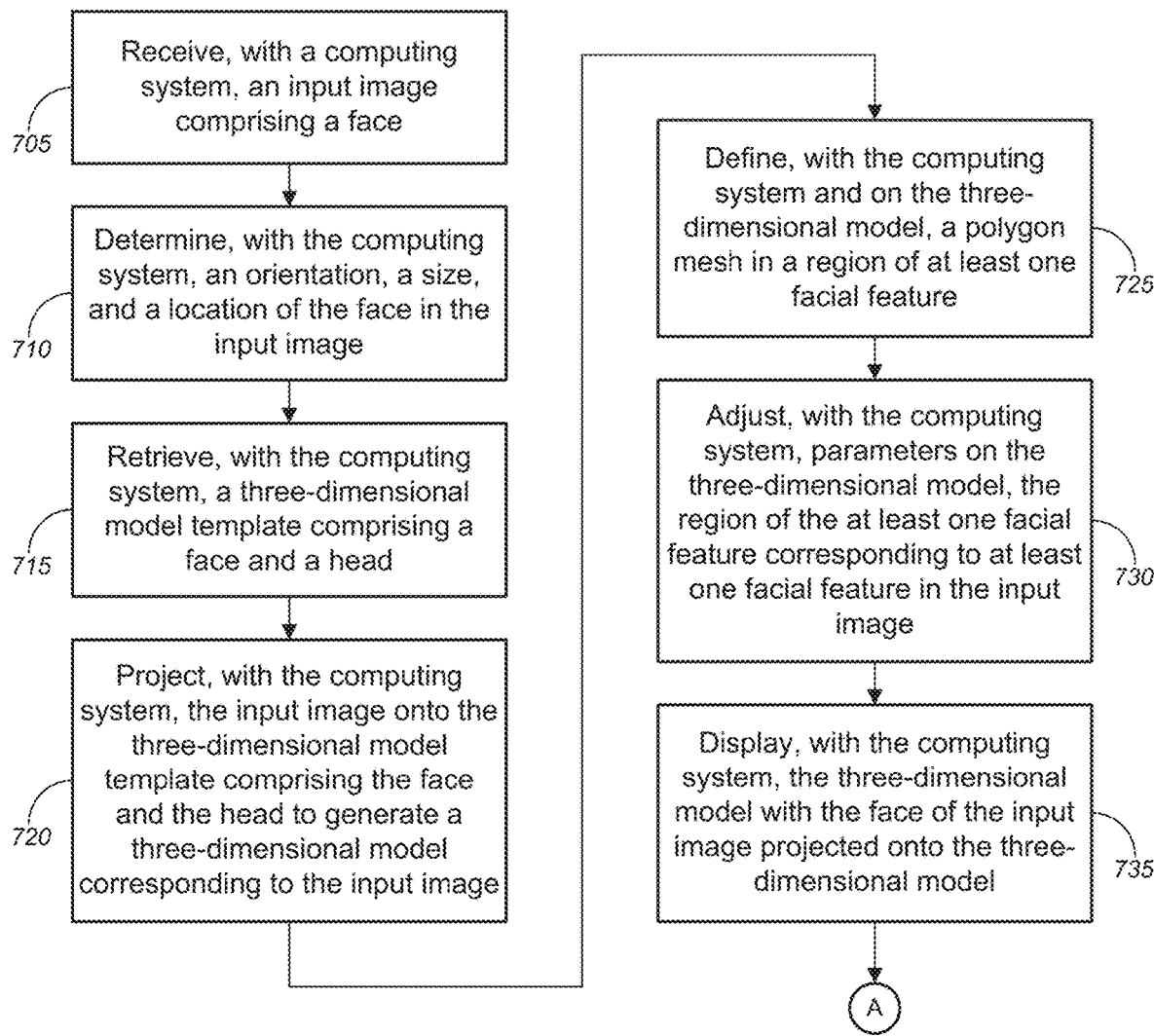
FIGS. 7A and 7B are flow diagrams illustrating yet another method for implementing three-dimensional facial modeling and visual speech synthesis, in accordance with various embodiments.
Figure 7B:
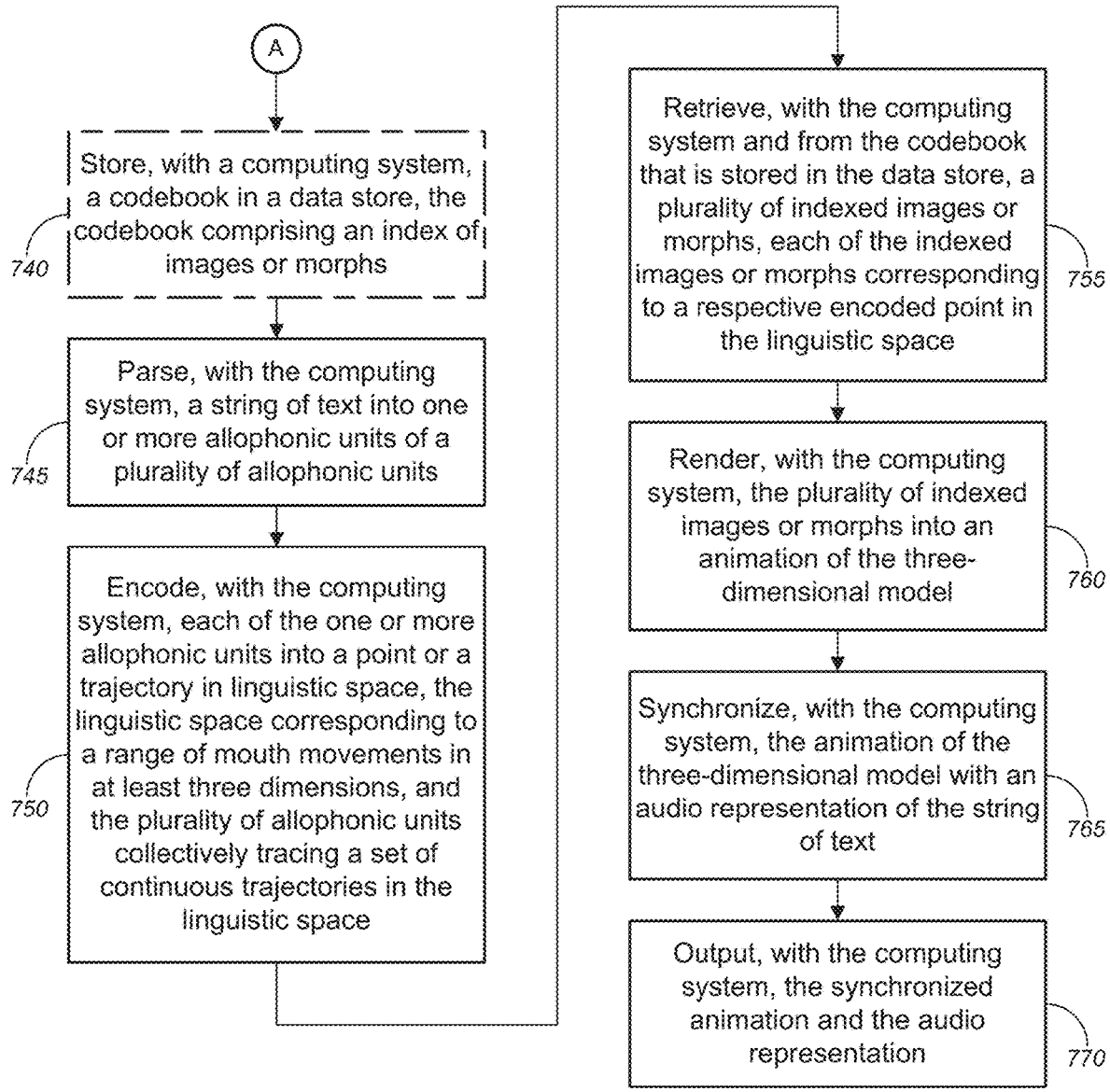

FIGS. 5A-5G (collectively, "FIG. 5") are flow diagrams illustrating a method 500 for implementing three-dimensional facial modeling and visual speech synthesis, in accordance with various embodiments. Method 500 of FIG. 5A continues onto FIG. 5B following the circular marker denoted, "A," continues onto FIG. 5C following the circular marker denoted, "B," or continues onto FIG. 5G following the circular marker denoted, "C." FIGS. 6A-6E (collectively, "FIG. 6") are flow diagrams illustrating another method 600 for implementing three-dimensional facial modeling and visual speech synthesis, in accordance with various embodiments. Method 600 of FIG. 6A continues onto FIG. 6B following the circular marker denoted, "A," continues onto FIG. 6C following the circular marker denoted, "B," or continues onto FIG. 6D following the circular marker denoted, "C." FIGS. 7A and 7B (collectively, "FIG. 7") are flow diagrams illustrating yet another method 700 for implementing three-dimensional facial modeling and visual speech synthesis, in accordance with various embodiments. Method 700 of FIG. 7A continues onto FIG. 7B following the circular marker denoted, "A." FIG. 5 is focused on establishing projection of an input image onto a three-dimensional model, while FIG. 6 is focused on rendering images or morphs into animations of the three-dimensional models to cause the projected input image to simulate visual speech, and FIG. 7 is focused on combining the processes of FIG. 5 and FIG. 6.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5, the method 600 illustrated by FIG. 6, and/or the method 700 illustrated by FIG. 7 can be implemented by or with (and, in some cases, are described below with respect to) the systems or embodiments 100, 200, 300, and 400 of FIGS. 1, 2, 3, and 4, respectively (or components thereof), such methods may also be implemented using any suitable hardware (or software) implementation. Similarly, while each of the systems or embodiments 100, 200, 300, and 400 of FIGS. 1, 2, 3, and 4, respectively (or components thereof), can operate according to the methods 500, 600, and/or 700 illustrated by FIGS. 5, 6, and/or 7, respectively (e.g., by executing instructions embodied on a computer readable medium), the systems or embodiments 100, 200, 300, and 400 of FIGS. 1, 2, 3, and 4 can each also operate according to other modes of operation and/or perform other suitable procedures.

Figure 5A:
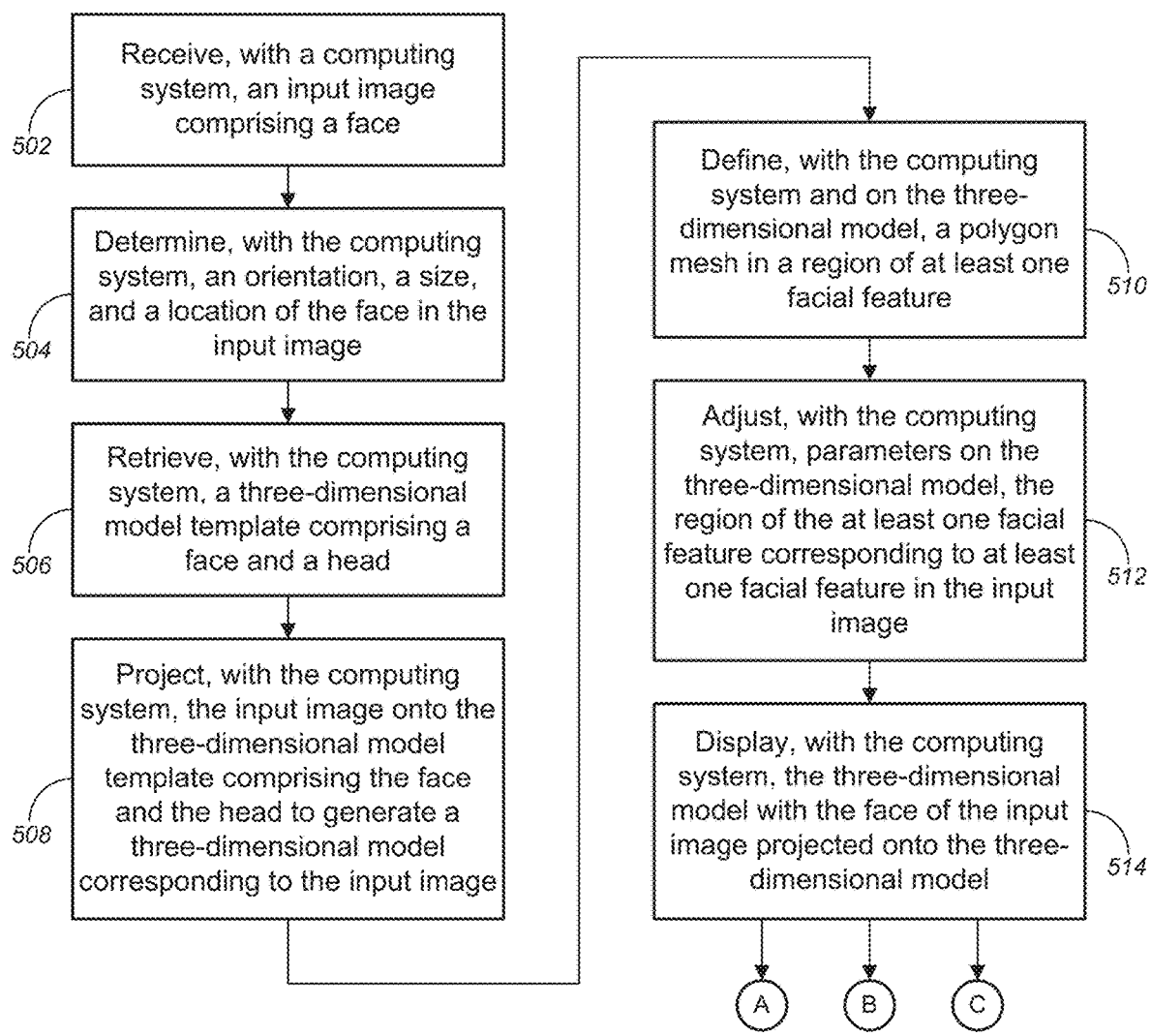
Figure 5G:
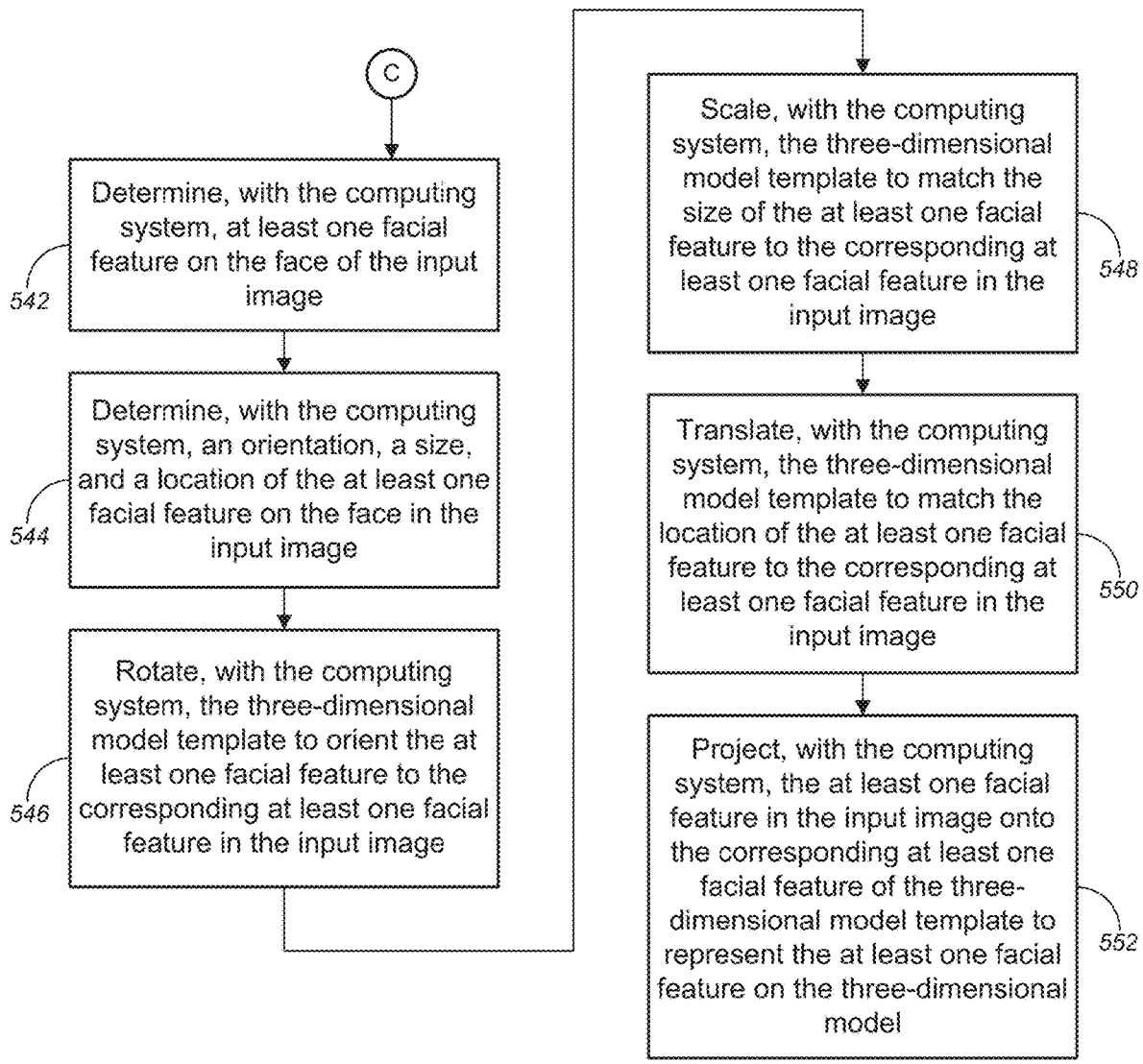

In the non-limiting embodiment of FIG. 5A, method 500, at block 502, might comprise receiving, with a computing system, an input image comprising a face. In some cases, the computing system might include, without limitation, at least one of a client computer, a host computer, a user device, a server computer over a network, a cloud-based computing system, or a distributed computing system, and/or the like. According to some embodiments, the input image might be captured with an image sensor of a device (e.g., a user device including, but not limited to, a laptop computer, a desktop computer, a smart phone, a mobile phone, a gaming console, a portable gaming device, a camera, a video camera, and/or the like). In some cases, the input image might be at least one of a photograph or a drawing, or the like.

At block 504, method 500 might comprise determining, with the computing system, an orientation, a size, and a location of the face in the input image. Method 500 might further comprise, at block 506, retrieving, with the computing system, a three-dimensional model template comprising a face and a head.

Method 500, at block 508, might comprise projecting, with the computing system, the input image onto the three-dimensional model template comprising the face and the head to generate a three-dimensional model corresponding to the input image. Method 500 might further comprise defining, with the computing system and on the three-dimensional model, a polygon mesh in a region of at least one facial feature (block 510). Method 500, at block 512, might comprise adjusting, with the computing system, parameters on the three-dimensional model, the region of the at least one facial feature corresponding to at least one facial feature in the input image. At block 514, method 500 might comprise displaying, with the computing system, the three-dimensional model with the face of the input image projected onto the three-dimensional model. According to some embodiments, the display of the three-dimensional model might be capable of being rotated in any direction. The process at block 514 of method 500 might continue onto block 516 in FIG. 5B, block 520 in FIG. 5C, and block 542 in FIG. 5G.

At block 516 in FIG. 5B (following the circular marker denoted, "A," from block 514 of FIG. 5A), method 500 might comprise determining, with the computing system, a perspective of an input image. Method 500 might further comprise applying, with the computing system, a perspective deformation to the three-dimensional model template (block 518).

Alternatively, or additionally, FIG. 5C (following the circular marker denoted, "B," from block 514 of FIG. 5A), method 500 might further comprise rotating, with the computing system, the three-dimensional model template comprising the face and the head to match the orientation of the face in the input image (block 520), scaling, with the computing system, the three-dimensional model template comprising the face and the head to match the size of the face in the input image (block 522), and translating, with the computing system, the three-dimensional model template comprising the face and the head to match the location of the face in the input image (block 524).

With reference to FIG. 5D, rotating the three-dimensional model (at block 520) might comprise determining, with the computing system, an eye alignment on the face of the input image (block 526) and rotating, with the computing system, the three-dimensional model template to align eyes of the three-dimensional model with the eyes of the input image (block 528).

Alternatively, or additionally, referring to FIG. 5E, scaling the three-dimensional model (at block 522) might comprise defining, with the computing system, a first box to frame the face in the input image (block 530), defining, with the computing system, a second box to frame the face of the three-dimensional model template (block 532), and scaling, with the computing system, the second box of the three-dimensional model template to fit the first box of the input image (block 534).

Alternatively, or additionally, with reference to FIG. 5F, translating the three-dimensional model (block 524) might comprise defining, with the computing system, a first box to frame the face in the input image (block 536), defining, with the computing system, a second box to frame the face of the three-dimensional model template (block 538), and translating, with the computing system, the second box of the three-dimensional model template so that the second box is centered on the first box in the input image (block 540).

According to some embodiments, the three-dimensional model template might comprise at least one facial feature. At block 542 in FIG. 5G (following the circular marker denoted, "C," from block 514 of FIG. 5A), method 500 might comprise determining, with the computing system, at least one facial feature on the face of the input image. Method 500, at block 544, might comprise determining, with the computing system, an orientation, a size, and a location of the at least one facial feature on the face in the input image. Method 500 might further comprise rotating, with the computing system, the three-dimensional model template to orient the at least one facial feature to the corresponding at least one facial feature in the input image (block 546), scaling, with the computing system, the three-dimensional model template to match the size of the at least one facial feature to the corresponding at least one facial feature in the input image (block 548), and translating, with the computing system, the three-dimensional model template to match the location of the at least one facial feature to the corresponding at least one facial feature in the input image (block 550). Method 500 might further comprise, at block 552, projecting, with the computing system, the at least one facial feature in the input image onto the corresponding at least one facial feature of the three-dimensional model template to represent the at least one facial feature on the three-dimensional model.

In some embodiments, the at least one facial feature of the input image might include, without limitation, at least one of an eye, lip, eyebrow, nose, cheek, ear, forehead, chin, or neck, and/or the like. The at least one facial feature of the three-dimensional model might include, but is not limited to, at least one of an eye, lip, eyebrow, nose, cheek, ear, forehead, chin, or neck, and/or the like.

In the non-limiting embodiment of FIG. 6A, method 600, at optional block 605, might comprise storing, with a computing system, a codebook in a data store, the codebook comprising an index of images or morphs, and/or the like. At block 610, method 600 might comprise parsing, with the computing system, a string of text into one or more allophonic units of a plurality of allophonic units. Method 600 might further comprise, at block 615, encoding, with the computing system, each of the one or more allophonic units into a point or a trajectory in linguistic space. The linguistic space might correspond to a range of mouth movements in at least three dimensions, while the plurality of allophonic units might collectively trace a set of continuous trajectories in the linguistic space. Method 600, at block 620, might comprise retrieving, with the computing system and from the codebook that is stored in the data store, a plurality of indexed images or morphs, each of the indexed images or morphs corresponding to a respective encoded point in the linguistic space.

Method 600 might further comprise rendering, with the computing system, the plurality of indexed images or morphs into an animation of the three-dimensional model (block 625), synchronizing, with the computing system, the animation of the three-dimensional model with an audio representation of the string of text (block 630), and outputting, with the computing system, the synchronized animation and the audio representation (block 635). The process at block 635 of method 600 might continue onto block 640 in FIG. 6B, block 650 in FIG. 6C, and block 655 in FIG. 6D.

At block 640 in FIG. 6B (following the circular marker denoted, "A," from block 635 of FIG. 6A), method 600 might comprise defining, with the computing system and on the three-dimensional model, a polygon mesh in a region of at least one facial feature. Method 600 might further comprise adjusting, with the computing system, parameters on the three-dimensional model, the region of the at least one facial feature corresponding to the at least one facial feature in the input image (block 645). According to some embodiments, rendering the plurality of indexed images or morphs into an animation of the three-dimensional model might comprise utilizing a series of the adjusted parameters on the three-dimensional model corresponding to the plurality of indexed images or morphs. Turning to FIG. 6E, adjusting parameters on the three-dimensional model (at block 645) might comprise at least one of simulating one or more emotions (block 660), retrieving images or morphs corresponding to selected emotions from among different emotions corresponding to images or morphs in the codebook (block 665), and/or simulating a movement or blink of the eye (wherein the region of the at least one facial feature comprises a region of an eye) (block 670).

Turning back to FIG. 6C, at block 650 (following the circular marker denoted, "B," from block 635 of FIG. 6A), method 600 might comprise constraining, with the computing system, at least one trajectory in the set of continuous trajectories to traverse a first specified dimension before traversing a second specified dimension.

At block 655 in FIG. 6D (following the circular marker denoted, "C," method 600 might comprise modifying, with the computing system, one or more trajectories in the set of continuous trajectories to model different speaking styles.

According to some embodiments, the codebook might comprise a plurality of indexes of images or morphs. In some cases, a first index might include images or morphs based on the three-dimensional model at a first resolution. In some instances, a second index might include, without limitation, images or morphs based on the three-dimensional model at a second resolution. In some embodiments, a second index might include, but is not limited to, images or morphs based on a second three-dimensional model.

In the non-limiting embodiment of FIG. 7A, method 700, at block 705, might comprise receiving, with a computing system, an input image comprising a face. In some cases, the computing system might include, without limitation, at least one of a client computer, a host computer, a user device, a server computer over a network, a cloud-based computing system, or a distributed computing system, and/or the like. According to some embodiments, the input image might be captured with an image sensor of a device (e.g., a user device including, but not limited to, a laptop computer, a desktop computer, a smart phone, a mobile phone, a gaming console, a portable gaming device, a camera, a video camera, and/or the like). In some cases, the input image might be at least one of a photograph or a drawing, or the like.

At block 710, method 700 might comprise determining, with the computing system, an orientation, a size, and a location of the face in the input image. Method 700 might further comprise, at block 715, retrieving, with the computing system, a three-dimensional model template comprising a face and a head.

Method 700, at block 720, might comprise projecting, with the computing system, the input image onto the three-dimensional model template comprising the face and the head to generate a three-dimensional model corresponding to the input image. Method 700 might further comprise defining, with the computing system and on the three-dimensional model, a polygon mesh in a region of at least one facial feature (block 725). Method 500, at block 730, might comprise adjusting, with the computing system, parameters on the three-dimensional model, the region of the at least one facial feature corresponding to at least one facial feature in the input image. At block 735, method 700 might comprise displaying, with the computing system, the three-dimensional model with the face of the input image projected onto the three-dimensional model. According to some embodiments, the display of the three-dimensional model might be capable of being rotated in any direction. The process at block 735 of method 700 might continue onto block 740 in FIG. 7B.

At optional block 740 in FIG. 7B (following the circular marker denoted, "A," from block 735 of FIG. 7A), method 700 might comprise storing, with a computing system, a codebook in a data store, the codebook comprising an index of images or morphs, and/or the like. At block 745, method 700 might comprise parsing, with the computing system, a string of text into one or more allophonic units of a plurality of allophonic units. Method 700 might further comprise, at block 750, encoding, with the computing system, each of the one or more allophonic units into a point or a trajectory in linguistic space. The linguistic space might correspond to a range of mouth movements in at least three dimensions, while the plurality of allophonic units might collectively trace a set of continuous trajectories in the linguistic space. Method 700, at block 755, might comprise retrieving, with the computing system and from the codebook that is stored in the data store, a plurality of indexed images or morphs, each of the indexed images or morphs corresponding to a respective encoded point in the linguistic space.

Method 700 might further comprise rendering, with the computing system, the plurality of indexed images or morphs into an animation of the three-dimensional model (block 760), synchronizing, with the computing system, the animation of the three-dimensional model with an audio representation of the string of text (block 765), and outputting, with the computing system, the synchronized animation and the audio representation (block 770).

Figure 8:
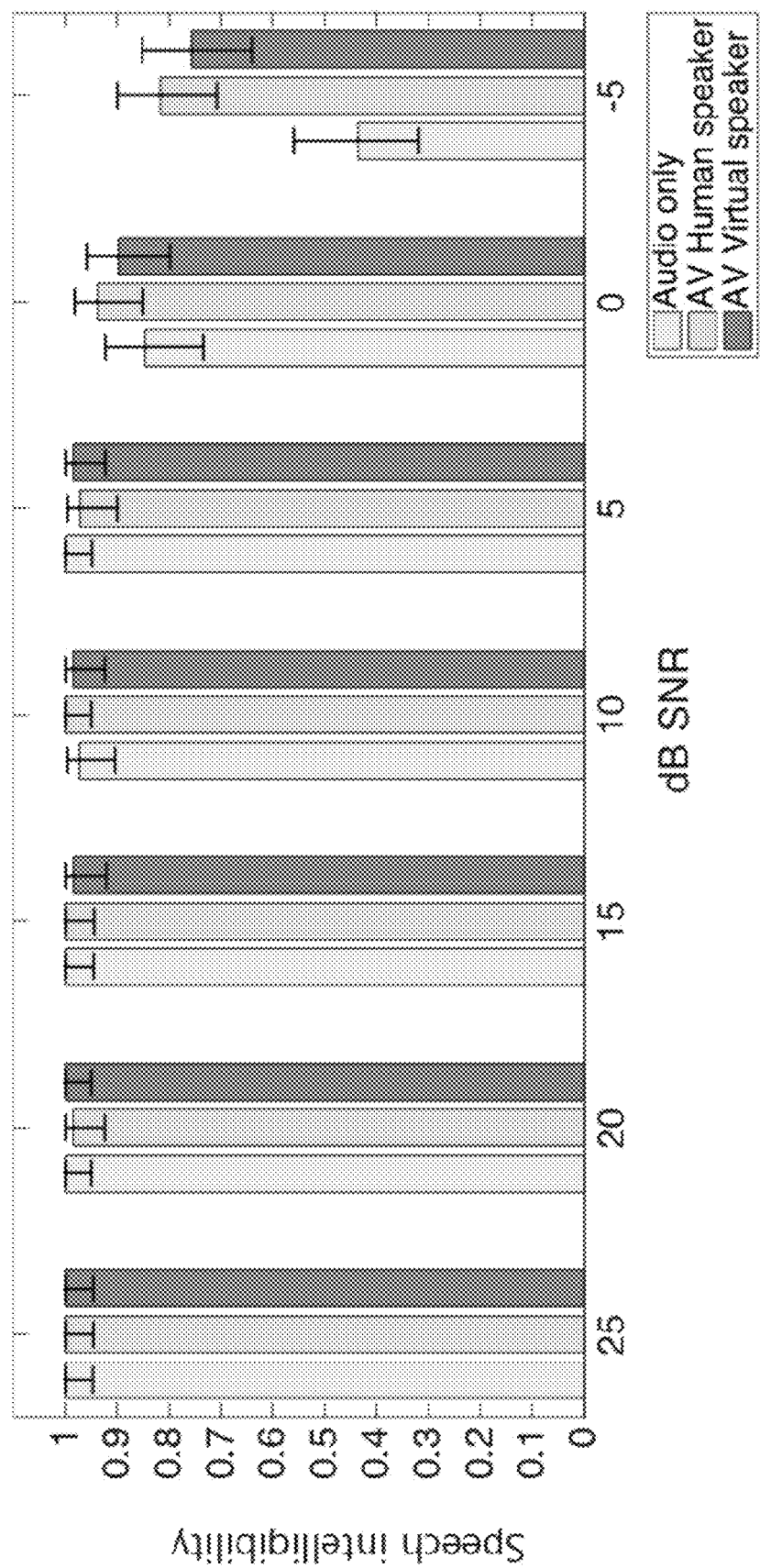
FIG. 8 is a graphical diagram illustrating results of a hearing speech intelligibility study.

FIG. 8 is a graphical diagram 800 illustrating results of a hearing speech intelligibility study. The experimental methods for the hearing speech intelligibility study were as follows. Auditory and auditory-visual perception of speech was compared in N=12 normal hearing adults recruited to listen to sentences presented at varying levels of multi-talker babble noise. Sentences ranged from 5 to 8 words long (with an average of 6.3 words). Three conditions were tested: auditory-visual ("AV") perception of the virtual clinician's speech ("V" or "Virtual speaker"; the virtual clinician's speech being generated in accordance with the techniques described above with respect to FIGS. 1-7, or the like), auditory-visual ("AV") perception of video recorded real human speakers ("H" or "Human speaker"), and auditory-only perception of real speech ("A" or "Audio only"). All three conditions used the same audio and only the visual presentation was varied. The stimuli consisted of 8 different lists of seven unique sentences each, and 4 different female speakers, 2 lists per speaker. To simulate a real-life scenario, the sentences in each list were presented with different levels of noise added in 5 dB steps from 25 to −5 dB signal-to-noise ratio ("SNR"). Each participant listened to a total of six randomly assigned lists, two each in each of the experimental conditions, for a total of 42 (i.e., 7×2×3) sentences presented per participant. The lists, and the order of experimental conditions, were randomized across participants.

Participants were seated in an electromagnetically shielded sound booth in front of a 26-inch (~66.0 cm) flat-screen LCD television and speaker at a viewing/listening distance of approximately 42 inches (~106.7 cm). Speech and noise were presented at a level of 65 dB HL via a loudspeaker. Listeners were asked to repeat each sentence after it was presented. An audiologist listened to, and transcribed each word in the sentence, assigning each word a score of "1" for accurate perception and "0" if in error.

Results report mean participant sentence scores for the first and second presentation in each condition. Since the scores are binomially distributed, the two-tailed Wilcoxon signed rank test was used to test significance of within-participant mean score differences across conditions. Probabilities were modeled as:

$$\text{log it(score)} \sim 1 + \text{condition} * dB_{SNR}.$$

Experimental results for the hearing speech intelligibility study were as follows. The overall participant accuracy was close to 100% but started to decrease around 5 dB SNR with significant reductions at −5 dB SNR. FIG. 8 depicts the results for the second presentation of stimuli. At the noisiest setting of −5 dB SNR, differences between the conditions were largest.

At −5 dB SNR, the participants' ability to perceive sentences did not change significantly between first and second presentations in the A condition (41% vs. 45%, p=0.36) or the H condition (81% vs. 81%, p=1). In contrast, the individuals' ability to perceive sentences by the second presentation were significantly different (higher) in the H condition compared to the A condition (81% vs. 45%, p<0.05). For the V condition, performance in the first presentation did not differ significantly from the A condition (36% vs. 41%, p=0.56), but performance changed significantly (increased) from the first to second presentation (36% vs. 74%, p<0.001), while the second presentation did not differ significantly from the H condition (74% vs. 81%, p=0.26). The participants' ability to perceive sentences in the second presentation were significantly different (higher) in the V condition compared to the A condition (74% vs. 45%, p<0.05).

Exemplary System and Hardware Implementation

Figure 9:
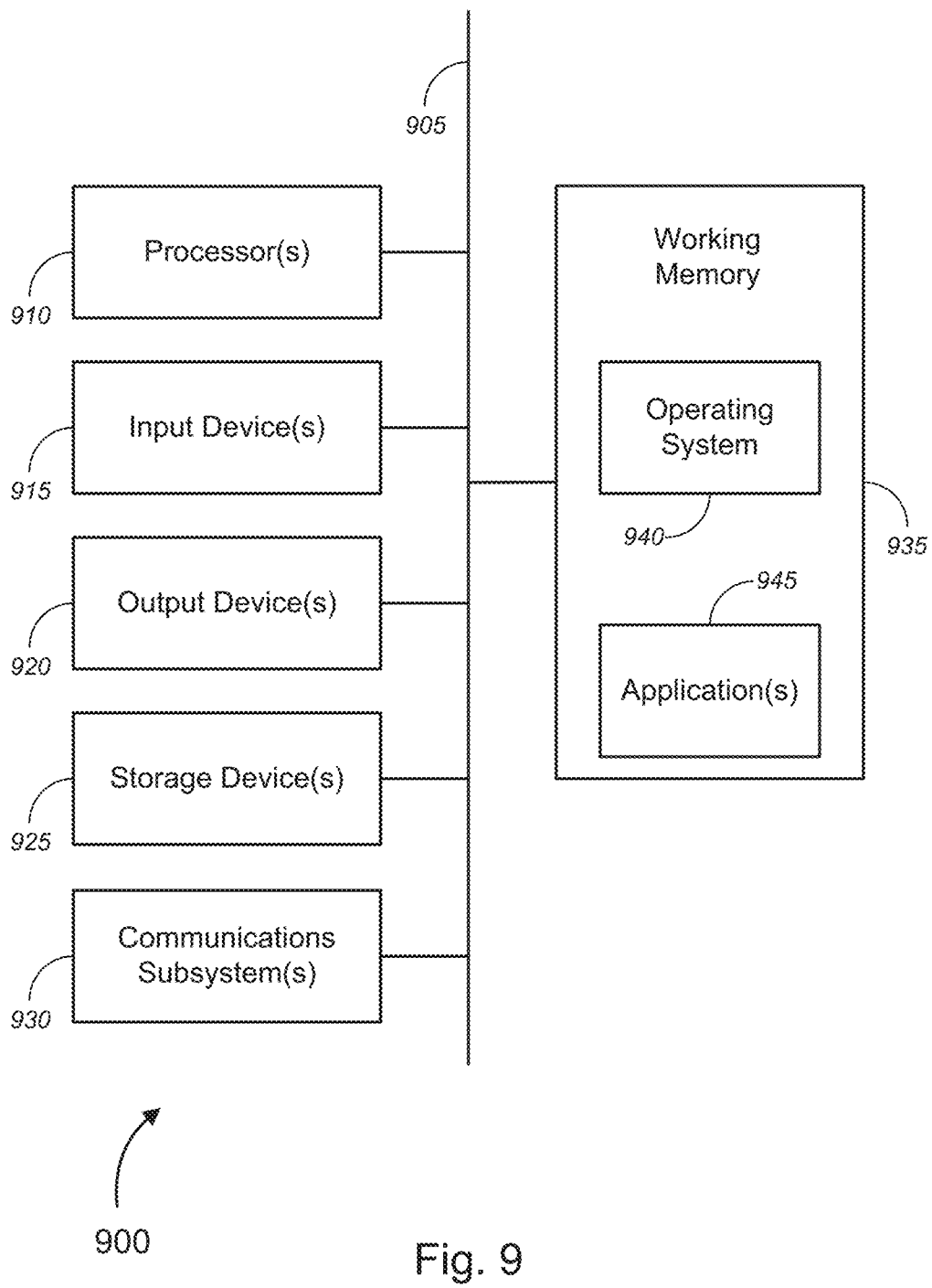
FIG. 9 is a block diagram illustrating an exemplary computer or system hardware architecture, in accordance with various embodiments.

FIG. 9 is a block diagram illustrating an exemplary computer or system hardware architecture, in accordance with various embodiments. FIG. 9 provides a schematic illustration of one embodiment of a computer system 900 of the service provider system hardware that can perform the methods provided by various other embodiments, as described herein, and/or can perform the functions of computer or hardware system (i.e., computing systems 105a and/or 105b, display device(s) 115, user device(s) 120, image capture device(s) 125, server(s) 145, etc.), as described above. It should be noted that FIG. 9 is meant only to provide a generalized illustration of various components, of which one or more (or none) of each may be utilized as appropriate. FIG. 9, therefore, broadly illustrates how individual system elements may be implemented in a relatively separated or relatively more integrated manner.

The computer or hardware system 900—which might represent an embodiment of the computer or hardware system (i.e., computing systems 105a and/or 105b, display device(s) 115, user device(s) 120, image capture device(s) 125, server(s) 145, etc.), described above with respect to FIGS. 1-7—is shown comprising hardware elements that can be electrically coupled via a bus 905 (or may otherwise be in communication, as appropriate). The hardware elements may include one or more processors 910, including, without limitation, one or more general-purpose processors and/or one or more special-purpose processors (such as microprocessors, digital signal processing chips, graphics acceleration processors, and/or the like); one or more input devices 915, which can include, without limitation, a mouse, a keyboard, and/or the like; and one or more output devices 920, which can include, without limitation, a display device, a printer, and/or the like.

The computer or hardware system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 900 might also include a communications subsystem 930, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 930 may permit data to be exchanged with a network (such as the network described below, to name one example), with other computer or hardware systems, and/or with any other devices described herein. In many embodiments, the computer or hardware system 900 will further comprise a working memory 935, which can include a RAM or ROM device, as described above.

The computer or hardware system 900 also may comprise software elements, shown as being currently located within the working memory 935, including an operating system 940, device drivers, executable libraries, and/or other code, such as one or more application programs 945, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 925 described above. In some cases, the storage medium might be incorporated within a computer system, such as the system 900. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 900 and/or might take the form of source and/or installable code, which, upon compilation and/or installation on the computer or hardware system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 900) to perform methods in accordance with various embodiments of the invention. According to a set of embodiments, some or all of the procedures of such methods are performed by the computer or hardware system 900 in response to processor 910 executing one or more sequences of one or more instructions (which might be incorporated into the operating system 940 and/or other code, such as an application program 945) contained in the working memory 935. Such instructions may be read into the working memory 935 from another computer readable medium, such as one or more of the storage device(s) 925. Merely by way of example, execution of the sequences of instructions contained in the working memory 935 might cause the processor(s) 910 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 900, various computer readable media might be involved in providing instructions/code to processor(s) 910 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 925. Volatile media includes, without limitation, dynamic memory, such as the working memory 935. In some alternative embodiments, a computer readable medium may take the form of transmission media, which includes, without limitation, coaxial cables, copper wire, and fiber optics, including the wires that comprise the bus 905, as well as the various components of the communication subsystem 930 (and/or the media by which the communications subsystem 930 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 900. These signals, which might be in the form of electromagnetic signals, acoustic signals, optical signals, and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

Figure 10:
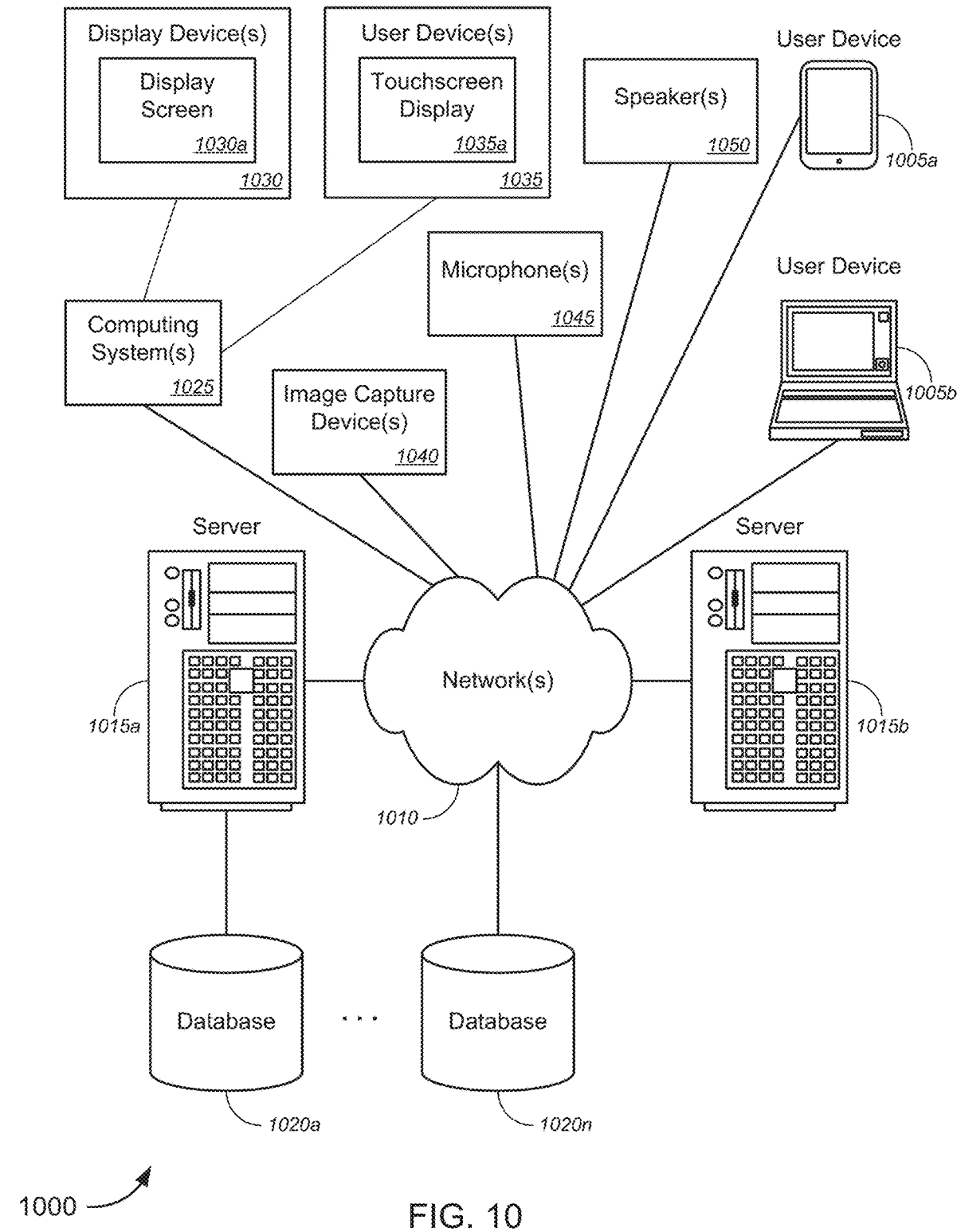
FIG. 10 is a block diagram illustrating a networked system of computers, computing systems, or system hardware architecture, which can be used in accordance with various embodiments.

As noted above, a set of embodiments comprises methods and systems for implementing three-dimensional facial modeling and visual speech synthesis. FIG. 10 illustrates a schematic diagram of a system 1000 that can be used in accordance with one set of embodiments. The system 1000 can include one or more user computers, user devices, or customer devices 1005. A user computer, user device, or customer device 1005 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 1005 can also have any of a variety of applications, including one or more applications configured to perform methods provided by various embodiments (as described above, for example), as well as one or more office applications, database client and/or server applications, and/or web browser applications. Alternatively, a user computer, user device, or customer device 1005 can be any other electronic device, such as a thin-client computer, Internet-enabled mobile telephone, and/or personal digital assistant, capable of communicating via a network (e.g., the network(s) 1010 described below) and/or of displaying and navigating web pages or other types of electronic documents. Although the exemplary system 1000 is shown with two user computers, user devices, or customer devices 1005, any number of user computers, user devices, or customer devices can be supported.

Certain embodiments operate in a networked environment, which can include a network(s) 1010. The network(s) 1010 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 1010 (similar to network(s) 155 FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 1015. Each of the server computers 1015 may be configured with an operating system, including, without limitation, any of those discussed above, as well as any commercially (or freely) available server operating systems. Each of the servers 1015 may also be running one or more applications, which can be configured to provide services to one or more clients 1005 and/or other servers 1015.

Merely by way of example, one of the servers 1015 might be a data server, a web server, a cloud computing device(s), or the like, as described above. The data server might include (or be in communication with) a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one or more application servers, which can be configured with one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 1005 and/or another server 1015. In some embodiments, an application server can perform one or more of the processes for implementing three-dimensional facial modeling and visual speech synthesis, as described in detail above. Data provided by an application server may be formatted as one or more web pages (comprising HTML, JavaScript, etc., for example) and/or may be forwarded to a user computer 1005 via a web server (as described above, for example). Similarly, a web server might receive web page requests and/or input data from a user computer 1005 and/or forward the web page requests and/or input data to an application server. In some cases, a web server may be integrated with an application server.

In accordance with further embodiments, one or more servers 1015 can function as a file server and/or can include one or more of the files (e.g., application code, data files, etc.) necessary to implement various disclosed methods, incorporated by an application running on a user computer 1005 and/or another server 1015. Alternatively, as those skilled in the art will appreciate, a file server can include all necessary files, allowing such an application to be invoked remotely by a user computer, user device, or customer device 1005 and/or server 1015.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020a-1020n (collectively, "databases 1020"). The location of each of the databases 1020 is discretionary: merely by way of example, a database 1020a might reside on a storage medium local to (and/or resident in) a server 1015a (and/or a user computer, user device, or customer device 1005). Alternatively, a database 1020n can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, the database 1020 can be a relational database, such as an Oracle database, that is adapted to store, update, and retrieve data in response to SQL-formatted commands. The database might be controlled and/or maintained by a database server, as described above, for example.

According to some embodiments, system 1000 might further comprise a computing system(s) 1025 (similar to computing systems 105a and/or 105b of FIG. 1, or the like), one or more display devices 1030 each with display screen 1030a (similar to display device(s) 115 of FIG. 1, or the like), one or more user devices 1035 each with touchscreen display 1035a (similar to user device(s) 120 of FIG. 1, or the like), and one or more capture devices 1040, one or more microphones (or other audio capture devices, or the like) 1045, one or more speakers (or other audio playback devices, or the like) 1050, and/or the like. In some embodiments, the computing system might include, without limitation, at least one of a client computer, a host computer, a user device, a server computer over a network, a cloud-based computing system, or a distributed computing system, and/or the like.

In operation, the computing system 1025, the user device(s) 1005*a*, 1005*b*, and/or 1035, and/or the server(s) 1015*a*-1015*b*, or the like (collectively, "computing system" or the like) might receive an input image comprising a face (either captured via image capture device(s) 1040 or retrieved from database(s) 1020 or local database(s)); determine an orientation, a size, and a location of the face in the input image; retrieve a three-dimensional model template comprising a face and a head; project the input image onto the three-dimensional model template comprising the face and the head to generate a three-dimensional model corresponding to the input image; define, on the three-dimensional model, a polygon mesh in a region of at least one facial feature; adjust parameters on the three-dimensional model, the region of the at least one facial feature corresponding to at least one facial feature in the input image; and display (i.e., to the display screen 1030*a* or the display device(s) 1030, or to touchscreen display 1035*a* of user device(s) 1005 or 1035, or the like) the three-dimensional model with the face of the input image projected onto the three-dimensional model. In some cases, the computing system might further rotate the three-dimensional model template comprising the face and the head to match the orientation of the face in the input image; scale the three-dimensional model template comprising the face and the head to match the size of the face in the input image; translate the three-dimensional model template comprising the face and the head to match the location of the face in the input image; and/or the like. Audio (e.g., speech or other sounds) may also be captured, in such cases, via microphone(s) 1045 or other audio capture devices (e.g. built-in microphone(s) or audio capture devices of user device(s) 1005 or 1035 (not shown), or the like).

Alternatively, or additionally, the computing system might parse a string of text into one or more allophonic units of a plurality of allophonic units; encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space; retrieve, from a codebook that is stored in a data store, a plurality of indexed images or morphs, each of the indexed images or morphs corresponding to a respective encoded point in the linguistic space, the codebook comprising an index of images or morphs; render the plurality of indexed images or morphs into an animation of the three-dimensional model; synchronize the animation of the three-dimensional model with an audio representation of the string of text; and output the synchronized animation (i.e., to the display screen 1030*a* or the display device(s) 1030, or to touchscreen display 1035*a* of user device(s) 1035, or the like) and the audio representation (i.e., to the speaker(s) 1050 or other audio playback device(s), or to built-in speakers in user device(s) 1005 or 1035, or the like).

These and other functions of the system 1000 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, an input image comprising a face;
   determining, with the computing system, an orientation, a size, and a location of the face in the input image;
   retrieving, with the computing system, a three-dimensional model template comprising a face and a head;
   projecting, with the computing system, the input image onto the three-dimensional model template comprising the face and the head to generate a three-dimensional model corresponding to the input image;
   defining, with the computing system and on the three-dimensional model, a polygon mesh in a region of at least one facial feature;
   adjusting, with the computing system, parameters on the three-dimensional model, the region of the at least one facial feature corresponding to at least one facial feature in the input image, wherein scaling the three-dimensional model comprises:
   defining, with the computing system, a first box to frame the face in the input image;
   defining, with the computing system, a second box to frame the face of the three-dimensional model template; and
   scaling, with the computing system, the second box of the three-dimensional model template by performing at least one of scaling to fit the first box of the input image or scaling so that the second box is centered on the first box in the input image; and
   displaying, with the computing system, the three-dimensional model with the face of the input image projected onto the three-dimensional model.

2. The method of claim 1, wherein the computing system comprises at least one of a client computer, a host computer, a user device, a server computer over a network, a cloud-based computing system, or a distributed computing system.

3. The method of claim 1, wherein the input image is captured with an image sensor of a device.

4. The method of claim 1, wherein the input image is at least one of a photograph or a drawing.

5. The method of claim 1, wherein rotating the three-dimensional model comprises:
   determining, with the computing system, an eye alignment on the face of the input image; and
   rotating, with the computing system, the three-dimensional model template to align eyes of the three-dimensional model with the eyes of the input image.

6. The method of claim 1, wherein the three-dimensional model template comprises at least one facial feature, the method further comprising:
   determining, with the computing system, at least one facial feature on the face of the input image;
   determining, with the computing system, an orientation, a size, and a location of the at least one facial feature on the face in the input image;
   rotating, with the computing system, the three-dimensional model template to orient the at least one facial feature to the corresponding at least one facial feature in the input image;
   scaling, with the computing system, the three-dimensional model template to match the size of the at least one facial feature to the corresponding at least one facial feature in the input image;
   translating, with the computing system, the three-dimensional model template to match the location of the at least one facial feature to the corresponding at least one facial feature in the input image; and
   projecting, with the computing system, the at least one facial feature in the input image onto the corresponding at least one facial feature of the three-dimensional model template to represent the at least one facial feature on the three-dimensional model.

7. The method of claim 6, wherein the at least one facial feature of the input image comprises at least one of an eye, lip, eyebrow, nose, cheek, ear, forehead, chin, or neck, and wherein the at least one facial feature of the three-dimensional model comprises at least one of an eye, lip, eyebrow, nose, cheek, ear, forehead, chin, or neck.

8. The method of claim 1, further comprising:
   determining, with the computing system, a perspective of an input image; and
   applying, with the computing system, a perspective deformation to the three-dimensional model template.

9. The method of claim 1, wherein the display of the three-dimensional model is capable of being rotated in any direction.

10. The method of claim 1, further comprising:
    rotating, with the computing system, the three-dimensional model template comprising the face and the head to match the orientation of the face in the input image;
    scaling, with the computing system, the three-dimensional model template comprising the face and the head to match the size of the face in the input image; and
    translating, with the computing system, the three-dimensional model template comprising the face and the head to match the location of the face in the input image.

11. A device, comprising:
    a display;
    one or more processors in communication with an image sensor, an accelerometer, and the display; and
    a non-transitory computer readable medium in communication with the one or more processors, the non-transitory computer readable medium having encoded thereon a set of instructions executable by the one or more processors to cause the device to:
    receive an input image comprising a face;
    determine an orientation, a size, and a location of the face in the input image;
    retrieve a three-dimensional model template comprising a face and a head;
    project the input image onto the three-dimensional model template comprising the face and the head to generate a three-dimensional model corresponding to the input image;
    define, on the three-dimensional model, a polygon mesh in a region of at least one facial feature;
    adjust parameters on the three-dimensional model, the region of the at least one facial feature corresponding to at least one facial feature in the input image, wherein scaling the three-dimensional model comprises:
       defining a first box to frame the face in the input image;
       defining a second box to frame the face of the three-dimensional model template; and
       scaling the second box of the three-dimensional model template by performing at least one of scaling to fit the first box of the input image or scaling so that the second box is centered on the first box in the input image; and
    display the three-dimensional model with the face of the input image projected onto the three-dimensional model.

12. An apparatus, comprising:
    one or more processors; and
    a non-transitory computer readable medium having encoded thereon a set of instructions executable by the one or more processors to cause the apparatus to:
    receive an input image comprising a face;
    determine an orientation, a size, and a location of the face in the input image;
    retrieve a three-dimensional model template comprising a face and a head;
    project the input image onto the three-dimensional model template comprising the face and the head to generate a three-dimensional model corresponding to the input image;
    define, on the three-dimensional model, a polygon mesh in a region of at least one facial feature;
    adjust parameters on the three-dimensional model, the region of the at least one facial feature corresponding to at least one facial feature in the input image, wherein scaling the three-dimensional model comprises:
       defining a first box to frame the face in the input image;
       defining a second box to frame the face of the three-dimensional model template; and
       scaling the second box of the three-dimensional model template by performing at least one of scaling to fit the first box of the input image or scaling so that the second box is centered on the first box in the input image; and
    display the three-dimensional model with the face of the input image projected onto the three-dimensional model.

13. A method, comprising:
- parsing, with a computing system, a string of text into one or more allophonic units of a plurality of allophonic units;
- encoding, with the computing system, each of the one or more allophonic units into a point or a trajectory in linguistic space, the linguistic space corresponding to a range of mouth movements in at least three dimensions, and the plurality of allophonic units collectively tracing a set of continuous trajectories in the linguistic space;
- retrieving, with the computing system and from a codebook that is stored in a data store, a plurality of indexed images or morphs, each of the indexed images or morphs corresponding to a respective encoded point in the linguistic space, the codebook comprising an index of images or morphs;
- rendering, with the computing system, the plurality of indexed images or morphs into an animation of the three-dimensional model;
- synchronizing, with the computing system, the animation of the three-dimensional model with an audio representation of the string of text; and
- outputting, with the computing system, the synchronized animation and the audio representation.

14. The method of claim 13, further comprising:
- defining, with the computing system and on the three-dimensional model, a polygon mesh in a region of at least one facial feature; and
- adjusting, with the computing system, parameters on the three-dimensional model, the region of the at least one facial feature corresponding to the at least one facial feature in the input image,
- wherein rendering the plurality of indexed images or morphs into an animation of the three-dimensional model comprises utilizing a series of the adjusted parameters on the three-dimensional model corresponding to the plurality of indexed images or morphs.

15. The method of claim 14, wherein adjusting parameters on the three-dimensional model comprises simulating one or more emotions.

16. The method of claim 14, wherein the codebook comprises images or morphs corresponding to different emotions, and wherein adjusting parameters comprises retrieving images or morphs corresponding to selected emotions.

17. The method of claim 14, wherein the region of the at least one facial feature comprises a region of an eye, and wherein adjusting parameters comprises simulating a movement or blink of the eye.

18. The method of claim 13, further comprising constraining, with the computing system, at least one trajectory in the set of continuous trajectories to traverse a first specified dimension before traversing a second specified dimension.

19. The method of claim 13, further comprising modifying, with the computing system, one or more trajectories in the set of continuous trajectories to model different speaking styles.

20. The method of claim 13, wherein the codebook comprises a plurality of indexes of images or morphs, and wherein a first index includes images or morphs based on the three-dimensional model at a first resolution.

21. The method of claim 20, wherein a second index includes images or morphs based on the three-dimensional model at a second resolution.

22. The method of claim 20, wherein a second index includes images or morphs based on a second three-dimensional model.

23. A device, comprising:
- one or more processors; and
- a non-transitory computer readable medium in communication with the one or more processors, the non-transitory computer readable medium having encoded thereon a set of instructions executable by the one or more processors to cause the device to:
  - parse a string of text into one or more allophonic units of a plurality of allophonic units;
  - encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space;
  - retrieve, from a codebook that is stored in a data store, a plurality of indexed images or morphs, each of the indexed images or morphs corresponding to a respective encoded point in the linguistic space, the codebook comprising an index of images or morphs;
  - render the plurality of indexed images or morphs into an animation of the three-dimensional model;
  - synchronize the animation of the three-dimensional model with an audio representation of the string of text; and
  - output the synchronized animation and the audio representation.

24. An apparatus, comprising:
- one or more processors; and
- a non-transitory computer readable medium having encoded thereon a set of instructions executable by the one or more processors to cause the apparatus to:
  - parse a string of text into one or more allophonic units of a plurality of allophonic units;
  - encode each of the one or more allophonic units into a point or a trajectory in linguistic space, the linguistic space corresponding to a range of mouth movements in at least three dimensions, and the plurality of allophonic units collectively tracing a set of continuous trajectories in the linguistic space;
  - retrieve, from a codebook that is stored in a data store, a plurality of indexed images or morphs, each of the indexed images or morphs corresponding to a respective encoded point in the linguistic space, the codebook comprising an index of images or morphs;
  - render the plurality of indexed images or morphs into an animation of the three-dimensional model;
  - synchronize the animation of the three-dimensional model with an audio representation of the string of text; and
  - output the synchronized animation and the audio representation.

25. A method, comprising:
- receiving, with a computing system, an input image comprising a face;
- determining, with the computing system, an orientation, a size, and a location of the face in the input image;
- retrieving, with the computing system, a three-dimensional model template comprising a face and a head;
- projecting, with the computing system, the input image onto the three-dimensional model template comprising the face and the head to generate a three-dimensional model corresponding to the input image;
- defining, with the computing system and on the three-dimensional model, a polygon mesh in a region of at least one facial feature;

adjusting, with the computing system, parameters on the three-dimensional model, the region of the at least one facial feature corresponding to at least one facial feature in the input image;

displaying, with the computing system, the three-dimensional model with the face of the input image projected onto the three-dimensional model;

parsing, with the computing system, a string of text into one or more allophonic units of a plurality of allophonic units;

encoding, with the computing system, each of the one or more allophonic units into a point or a trajectory in linguistic space, the linguistic space corresponding to a range of mouth movements in at least three dimensions, and the plurality of allophonic units collectively tracing a set of continuous trajectories in the linguistic space;

retrieving, with the computing system and from a codebook that is stored in a data store, a plurality of indexed images or morphs, each of the indexed images or morphs corresponding to a respective encoded point in the linguistic space, the codebook comprising an index of images or morphs;

rendering, with the computing system, the plurality of indexed images or morphs into an animation of the three-dimensional model;

synchronizing, with the computing system, the animation of the three-dimensional model with an audio representation of the string of text; and outputting, with the computing system, the synchronized animation and the audio representation.

\* \* \* \* \*